United States Patent [19]

Krämer et al.

[11] Patent Number: 4,890,988

[45] Date of Patent: Jan. 2, 1990

[54] CANNED MOTOR PUMP

[75] Inventors: Roland Krämer, Gundelfingen; Robert Neumaier, Glottertal, both of Fed. Rep. of Germany

[73] Assignee: Heyko Reinecker, Freiburg, Fed. Rep. of Germany

[21] Appl. No.: 122,111

[22] Filed: Nov. 18, 1987

[30] Foreign Application Priority Data

| Nov. 20, 1986 [DE] | Fed. Rep. of Germany | 3639720 |
|---|---|---|
| Nov. 20, 1986 [DE] | Fed. Rep. of Germany | 3639719 |
| Jun. 4, 1987 [EP] | European Pat. Off. | 87108088.3 |
| Jul. 11, 1987 [EP] | European Pat. Off. | 87110038.4 |

[51] Int. Cl.$^4$ .............................................. F04B 39/06
[52] U.S. Cl. .................................. 417/372; 417/420; 417/423.8; 165/169
[58] Field of Search .................. 417/63, 372, 373, 420, 417/423 R, 423 M, 423 P, 423 T, 423.8; 464/17, 29; 310/87, 57, 52, 54, 55, 64; 73/46; 340/682; 92/5 R; 165/47, 70, 11.1, 169

[56] References Cited

U.S. PATENT DOCUMENTS

| 2,662,478 | 12/1953 | Surre | 417/63 |
|---|---|---|---|
| 2,862,120 | 11/1958 | Onsrud | 165/170 |
| 3,131,638 | 5/1964 | Wilson et al. | 92/5 R |
| 3,163,790 | 12/1964 | White | 310/54 |
| 3,605,566 | 9/1971 | Vetter | 417/63 |
| 3,661,060 | 5/1972 | Bowen | 417/63 X |
| 4,013,384 | 3/1977 | Oikawa | 417/420 X |
| 4,120,618 | 10/1978 | Klaus | 417/420 |
| 4,226,574 | 10/1980 | Villette | 417/420 |
| 4,569,634 | 2/1986 | Mantell | 417/63 |
| 4,752,194 | 6/1988 | Wienen et al. | 417/420 |

FOREIGN PATENT DOCUMENTS

| 1907677 | 8/1970 | Fed. Rep. of Germany . | |
|---|---|---|---|
| 2315191 | 10/1974 | Fed. Rep. of Germany . | |
| 2548798 | 6/1976 | Fed. Rep. of Germany . | |
| 3207436 | 9/1983 | Fed. Rep. of Germany . | |
| 3334638 | 3/1984 | Fed. Rep. of Germany | 417/63 |
| 3542337 | 4/1987 | Fed. Rep. of Germany . | |
| 864365 | 4/1941 | France . | |

Primary Examiner—Carlton R. Croyle
Assistant Examiner—Eugene L. Szezecina, Jr.
Attorney, Agent, or Firm—Peter K. Kontler

[57] ABSTRACT

A canned motor pump wherein the can has two coaxial tubular walls defining an annular space for the flow of a heat exchange fluid which heats or cools the can. If the can has an end wall, the latter can be formed with an additional space which communicates with the annular space. The driven rotor within the can can be rotated by a stator which surrounds the can or by a hollow rotor which rotates the driven rotor by way of one or more magnets. The can can be heated by an electric heater.

33 Claims, 13 Drawing Sheets

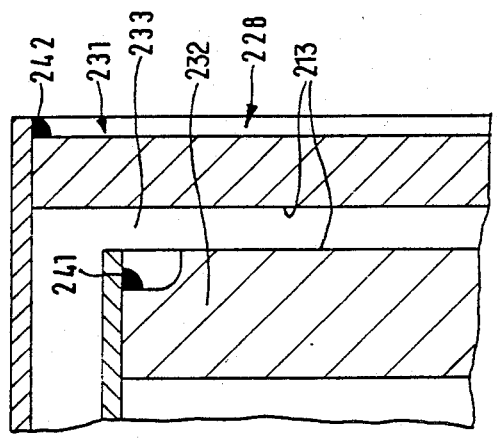
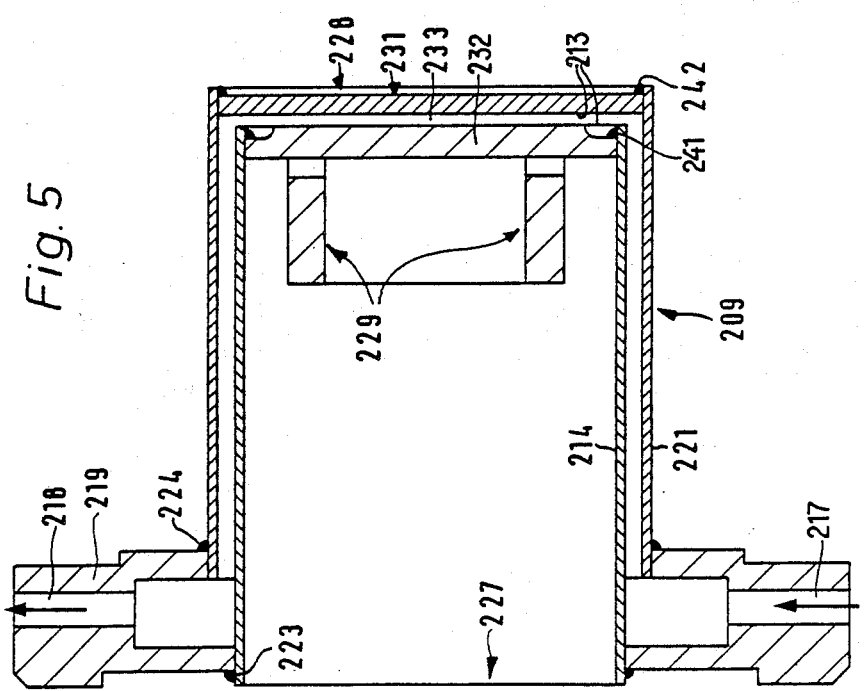

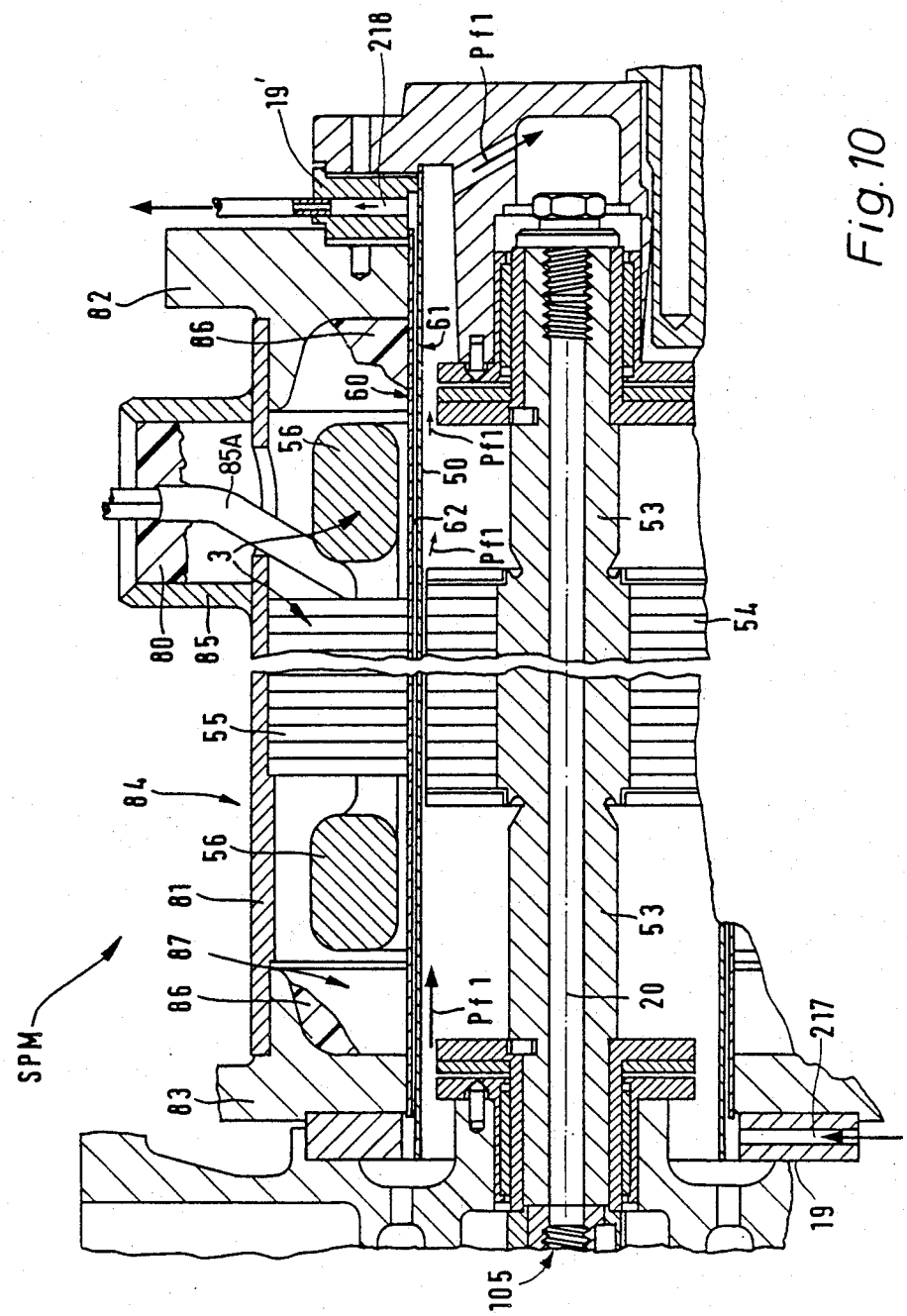

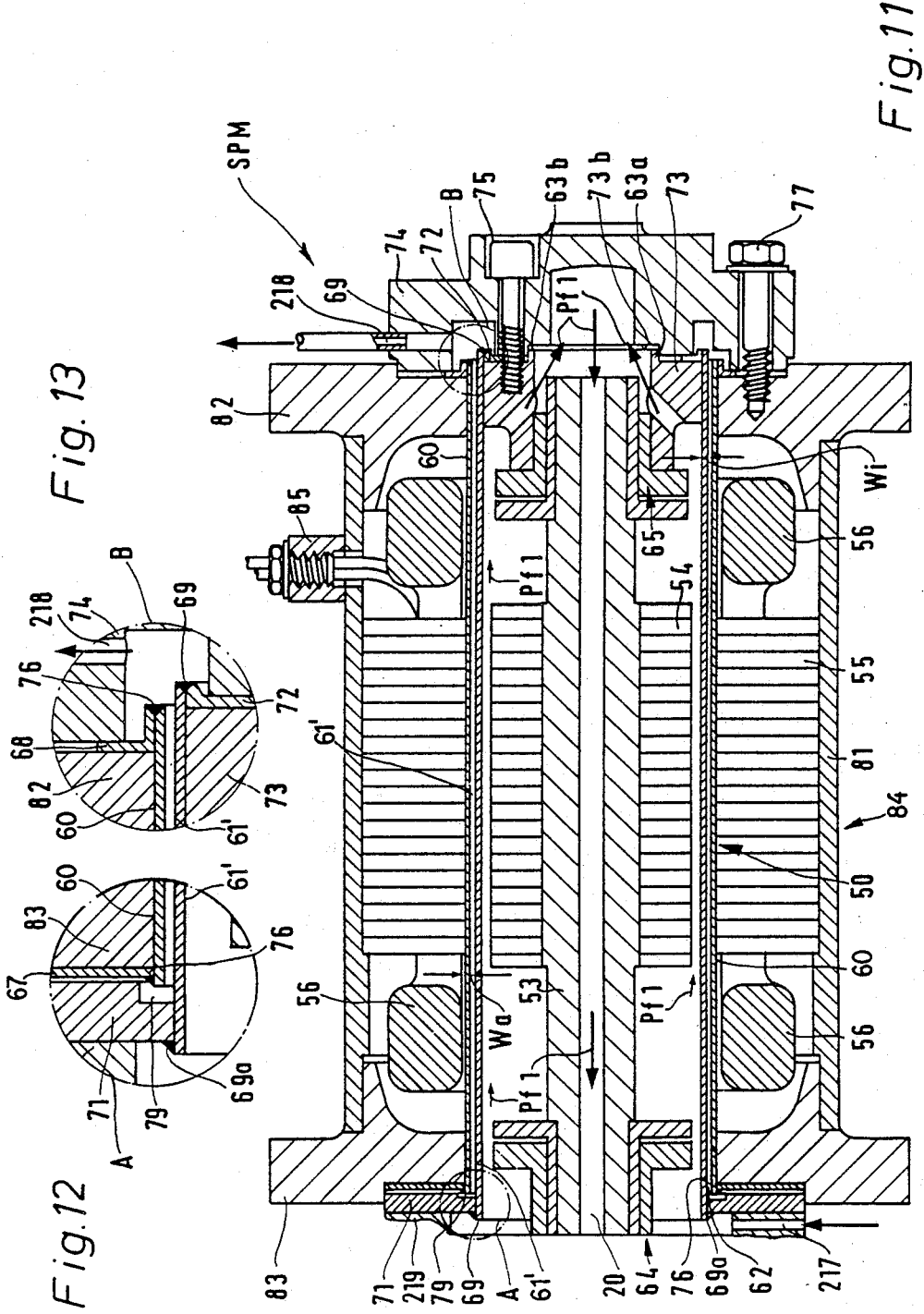

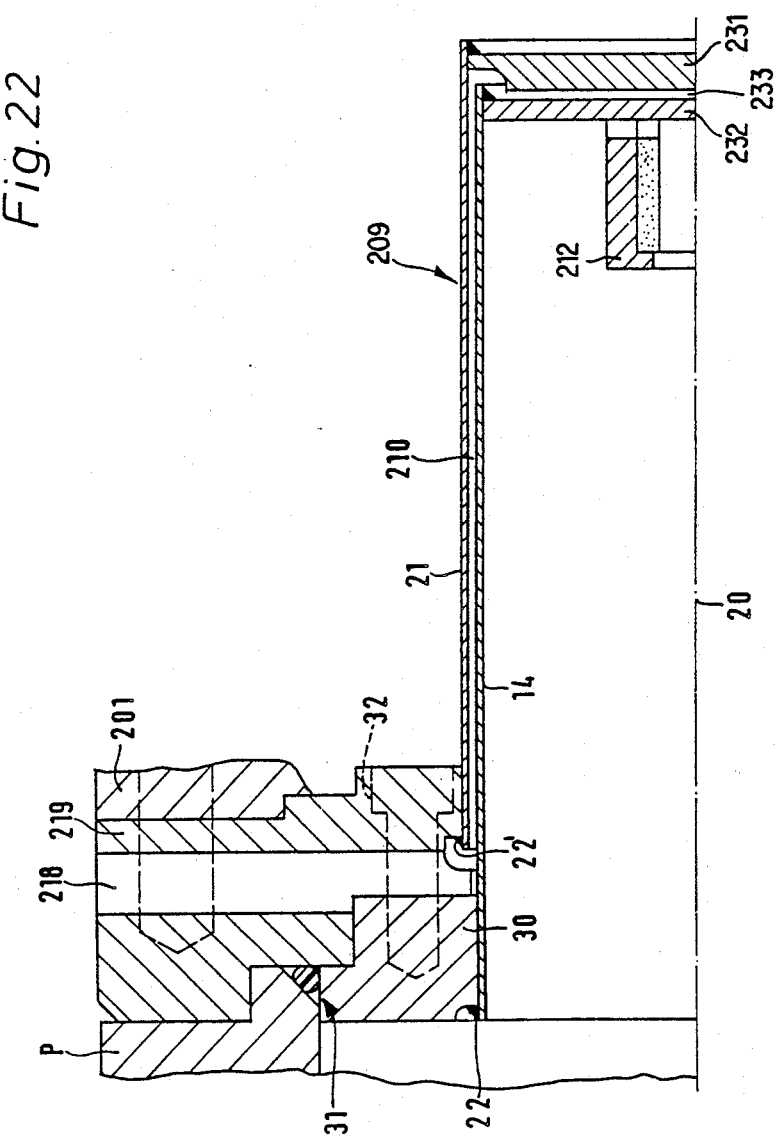

CANNED MOTOR PUMP

BACKGROUND OF THE INVENTION

The invention relates to improvements in fluid flow machines in general, and more particularly to improvements in canned motor pumps wherein a so-called can (normally a high-quality tube made of steel or the like) is installed between the driving and driven units of the motor which rotates the pumping element or elements.

Canned motor pumps are known in a variety of forms and sizes and are used for a variety of different purposes. For example, such pumps can be used to circulate liquids at elevated temperatures, to convey chemical substances and/or under many other circumstances when the conveyed fluid media are toxic, radioactively contaminated, hot, corrosive or exhibit two or more of these properties. Reference may be had, for example, to German Utility Model No. 82 08 046 which discloses a conventional canned motor centrifugal pump wherein the driving unit transmits torque to the driven unit by way of a magnetic clutch. The can hermetically seals the driving unit from the driven unit so that the pump can convey an aggressive fluid medium which is permitted to enter the interior of the can but is maintained out of contact with the parts surrounding the can and/or with the surrounding atmosphere. An important advantage of canned motor pumps, including the pump which is disclosed in the German Utility Model, is that such pumps can operate properly without stuffing boxes or other types of seals and require no maintenance or a minimum of maintenance for long periods of time. The likelihood of leakage (while the can is intact) is negligible.

However, conventional canned motor pumps also exhibit a number of serious drawbacks, especially a concerns their versatility. For example, a conventional canned motor pump cannot readily convey a molten metallic or plastic substance or another flowable medium whose viscosity is high or extremely high. If the conveyed medium is a molten substance (e.g., a metal or a plastic material), the medium tends to solidify in the interior of the can (when the motor is arrested) and strongly opposes renewed starting of the driven unit to an extent such that the starting is impossible or that an attempt to restart the motor will entail serious damage to, or total destruction of, the driven unit and/or other parts including the can. The situation is analogous when the conveyed medium does not exhibit a tendency to actually solidify but merely a pronounced tendency to increase its viscosity in the absence of heating, e.g., in response to prolonged dwell in the interior of the can. Many substances are readily flowable only at elevated temperatures so that a relatively short interval of stagnation in the interior of the can at room temperature or even above room temperature will cause similar problems as the solidification of a molten metallic or plastic substance. The situation is aggravated if the driving and driven units are coupled to each other by a magnetic clutch (as in the aforementioned German Utility Model) because, when the driven unit exhibits a pronounced resistance to rotation with the driving unit (e.g., due to solidification or due to a pronounced increase of viscosity of conveyed fluid medium in the interior of the can), the driving unit merely rotates (slips) but cannot transmit torque to the driven unit.

Applicants are not familiar with any proposals to heat the can, probably because persons skilled in this art are aware of the need to establish very narrow clearances between the can and the adjacent parts of the driving and driven units.

It is further known to design a canned motor pump in such a way that a portion of the stream of conveyed fluid medium is diverted and is caused to flow along a predetermined path in order to lubricate plain bearings for the driven unit and to withdraw heat which is generated by the magnetic clutch and/or to withdraw heat which is generated as a result of frictional engagement of one or more plain (friction) bearings with the driven unit. The diverted portion of the fluid medium is returned into the main stream of such medium where it is likely to unduly raise the temperature of conveyed flowable material. Therefore, canned motor pumps wherein a portion of the conveyed medium is diverted for the purposes of lubricating and/or removing heat cannot be put to use in a number of important fields where an acceptable canned motor pump could perform the fluid conveying operation more satisfactorily than other types of pumps.

Still another drawback of conventional canned motor pumps is that the can is a highly sensitive part which is not always capable of standing long periods of use. For example, the can is likely to be damaged (so that it develops a leak) in response to damage to the bearing or bearings for the driven unit in the interior of the can. Moreover, the can is likely to be rapidly damaged or even destroyed as a result of contact with highly aggressive or corrosive chemicals and/or other conveyed fluid media. Still further, the presence of contaminants in the form of solid particles in the conveyed fluid medium is also likely to cause damage to (abrade) the can. For example, particles of ferrite are often a cause of serious damage to a conventional can. Such particles are attracted and entrained by the orbiting magnets of the clutch to thereby abrade the can in response to movement of these particles relative to the can and/or vice versa.

Still another potential cause of damage to the can are bearings which are made of or contain a ceramic material. Thus, while ceramic bearings exhibit numerous important advantages, they are brittle and are likely to be fragmentized in response to impacts and/or abrupt temperature changes. The fragments of ceramic material circulate relative to and thereby damage the thin-walled can.

It was further ascertained that the can of a conventional canned motor pump is likely to be damaged by the driven unit which is disposed in the interior of the can. For example, if the driven unit is allowed to run dry, it expands or undergoes other forms of distortion and comes in actual contact with the can.

OBJECTS AND SUMMARY OF THE INVENTION

An object of the invention is to provide a novel and improved can for use in canned motor pumps.

Another object of the invention is to provide a canned motor pump whose versatility greatly exceeds that of conventional canned motor pumps.

A further object of the invention is to provide a canned motor pump wherein the can can stand more abuse than in conventional pumps and wherein the can can perform several functions which cannot be performed by heretofore known cans.

An additional object of the invention is to provide a canned motor pump which can prevent solidification and/or excessive thickening of conveyed fluid media in a novel and improved way.

Another object of the invention is to provide the pump with novel and improved means for supporting the can in the space between the driving and driven units of the pump motor.

Still another object of the invention is to provide the pump with novel and improved means for facilitating access to the can.

A further object of the invention is to provide a novel and improved can which can be installed in all kinds of pumps including so-called water or liquid ring pumps, canned motor pumps wherein the pumping element or elements are driven through the medium of a clutch, and pumps wherein the pumping element or elements receive torque from an electric motor having a stator which surrounds the can.

Another object of the invention is to provide a novel and improved method of detecting leakage of conveyed fluid media and/or other fluids in a canned motor pump.

An additional object of the invention is to provide a novel and improved method of assembling and dismantling a canned motor pump.

A further object of the invention is to provide a novel and improved motor for use in a canned motor pump.

An additional object of the invention is to provide a novel and improved can which can be used as a superior substitute for heretofore known cans in existing canned motor pumps.

One feature of the present invention resides in the provision of a canned motor pump which comprises a hollow (stationary or rotary) driving unit (such as the stator of an electric motor or a motor-driven shaft-rotor combination), a rotary driven unit which is surrounded by the driving unit and can constitute the rotor of the electric motor having the aforementioned stator or a rotor which is driven by the rotor of the rotary driving unit by way of one or more magnets), means for sealing the driving and driven units from each other including a can which is interposed between the driving and driven units and has a plurality of walls defining at least one space, and means for admitting a heat exchange fluid (coolant or heating fluid) into the space of the can. The width of the space is preferably in the range of 0.1–3 mm, most preferably 0.1–0.5 mm.

The driven unit comprises at least one pumping element which is adjacent a first end of the can. The walls of the can can include an inner tube and an outer tube, and the tubes can be substantially or exactly coaxial with the rotary driven unit. Such pump can further comprise support means sealingly connected with at least one of the tubes in the region of at least one end of the can. The support means can include a flange at the first end of the can. Means can be provided for mechanically connecting the flange to the at least one tube of the can.

The support means can include a flange at the second end of the can, i.e., at that end which is remote from the pumping element.

The support means can also include a closure at the second end of the can.

The admitting means can be provided in the support means, and the pump can further comprise fluid evacuating means provided in the support means and serving to establish a path for evacuation of heat exchange fluid from the space within the can, i.e., for evacuation of the fluid which is supplied by the admitting means.

The support means can comprise a first support which is sealingly connected to at least one of the tubes at the first end of the can, and a second support which is sealingly connected to at least one of the tubes at the second end of the can. The admitting means can be provided in one of the supports, and the evacuating means can be provided in the other support.

If the support means includes a single support (e.g., a flange) at one end of the can (e.g., at the first end), the admitting means and the evacuating means can be provided in the single support (for example, diametrically opposite each other).

Guide means can be provided to regulate the flow of heat exchange fluid between the fluid admitting and fluid evacuating means, especially if the fluid admitting and fluid evacuating means are disposed at opposite ends of the can. The guide means can be placed adjacent one end (especially the second end) of the can. If the can comprises an end wall at one of its ends, the guide means can be provided next to the end wall. It is presently preferred to employ guide means in the form of ribs, wings or like parts which are substantially or exactly parallel to the axis of the driven unit.

The end wall of the can can be provided with at least one passage which forms part of the aforementioned space. Such end wall can comprise several panels which flank the passage. The panels can include a first panel which seals the outer tube of the can at the second end of the can, and a second panel which seals the inner tube at the second end of the can.

The inner tube can be thinner (in fact, much thinner) than the outer tube. It is preferred to employ an elastically deformable inner tube which can expand radially outwardly toward and into engagement with the outer tube in response to a drop of pressure in the annular portion of the internal space of the can to a predetermined level below the pressure in the interior of the can (this can happen if the outer tube is damaged and allows for uncontrolled leakage of heat exchange fluid into the area around the can).

The aforementioned support means can include a support which is rigid with and extends substantially radially outwardly from one of the tubes at one end of the can. Such pump further comprises a housing for the can and means for separably mounting the support in the housing so that the support and the one tube can be jointly installed in and jointly removed from the housing. The can can further comprise the aforementioned end wall which can be sealingly connected to the one tube at the other end of the can so that the end wall can be removed from or inserted into the housing jointly with the one tube and the support. The housing can include a flange at the other end of the can, and such flange can be provided with a hole or bore for an end portion of the one tube. The sealing means preferably further comprises at least one annular sealing element (e.g., an elastic sealing ring) which is interposed between the end portion of the one tube and the flange. The support means can include a second support for the other tube of the can, and such second support can be disposed at the one end of the can. An end portion of the other tube which is connected to the second support can extend into the aforementioned bore or hole of the flange, and the sealing means can further comprise a second sealing element which is interposed between the flange and the end portion of the other tube. The means for evacuating heat exchange fluid from the space within the can can be provided in the flange. The housing can include means for centering the flange and the one tube or both tubes with reference to the axis of rotation of the driven unit. The housing can also comprise a closure for the end portion of the one tube, and the flange and the closure can be disposed at the second end of the can. A centering portion of the closure can extend into the end portion of the one tube.

The pump can further comprise leak detector means including means for monitoring the rates of admission of fluid into and evacuation of fluid from the space within the can.

At least one tube of the can can include two tubular sections which define an annular compartment; the leak detector means of such pump is or can be operatively connected with the tube which has two sections, and such leak detector means can be equipped with means for indicating the presence of leaks in the tubular sections.

Another feature of the invention resides in the provision of a canned motor pump comprising a hollow driving unit, a rotary driven unit which is surrounded by the driving unit, a can which is sealingly installed between the driving and driven units, and electric heating means for the can. The can may comprise at least one tubular wall and at least one end wall at one end of the tubular wall. The end wall can be provided with internal bearing means for the driven unit, and the electric heating means can be provided (entirely or in part) on or in the bearing means.

The heating means can comprise one or more wirelike electric heating elements which surround the can and/or are recessed into the can, i.e., into the tubular wall or walls and/or into the end wall or walls. If desired, the heating means can be installed in the space which is defined by the walls of the can, e.g., in the annular space between the inner and outer tubular walls of the can.

As stated above, the driving unit can include a rotor or a stator, and the driven unit includes a rotor which is rotated by the driving unit and transmits torque to the pumping element or elements.

A further feature of the invention resides in the provision of a can which can be used in a canned motor pump. The improved can has a plurality of walls which define a space for the circulation of a heat exchange fluid, e.g., water, steam or oil.

The walls can include a plurality of substantially coaxial tubular walls, and the space can include at least one annular portion between the tubular walls.

The walls can further include an end wall at one end of at least one tubular wall, and the space can include a portion in the end wall.

The novel features which are considered as characteristic of the invention are set forth in particular in the appended claims. The improved pump itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is an axial sectional view of another can;

FIG. 6 is an enlarged view of a detail in the upper right-hand portion of FIG. 5;

FIG. 10 is a fragmentary axial sectional view of a canned motor pump wherein the driving unit includes the stator of an electric motor;

FIG. 11 is an axial sectional view of a modification of the pump which is shown in FIG. 10;

FIG. 12 is an enlarged view of a detail within the phantom-line circle A in the upper left-hand portion of FIG. 11;

FIG. 13 is an enlarged view of a detail within the phantom-line circle B in the upper right-hand portion of FIG. 11;

FIG. 22 is a fragmentary axial sectional view of a can which can be used in the pump of FIGS. 20 and 21.

DESCRIPTION OF THE PREFERRED EMBODIMENTS

Figure 1:
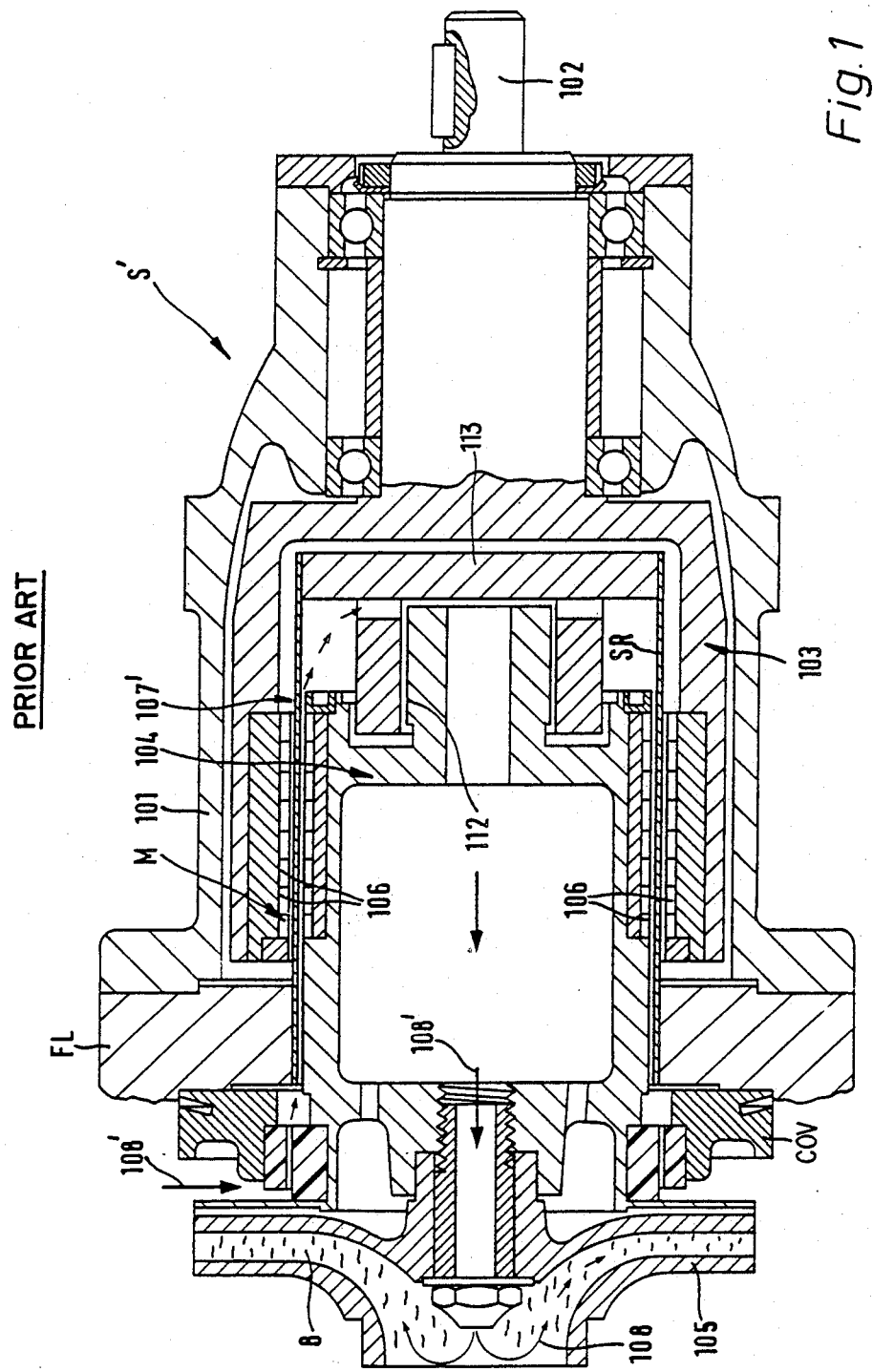
FIG. 1 is a somewhat schematic axial sectional view of a conventional canned motor pump.

FIG. 1 shows certain details of a conventional canned motor pump S' wherein an extension 101 of the pump housing surrounds a rotary driving unit including a motor-driven shaft 102 and a hollow rotor 103 at one end of the shaft 102. The rotor 103 resembles a cup and surrounds the rotor of a rotary driven unit 104 one end portion of which extends from the rotor 103 and is attached to the pumping element here shown as an impeller 105. The fluid medium 8 which is being conveyed by the impeller 105 enters the central portion of the impeller and flows (see the arrow 108) radially outwardly when the motor for the shaft 102 is on, i.e., when the rotor 103 of the driving unit 102-103 rotates the rotor of the driven unit 104 by way of a clutch M including a plurality of magnets 106.

The means 107' for hermetically sealing the rotor of the driven unit 104 from the rotor 103 of the driving unit 102-103 of the pump S' includes a can SR having a single tubular wall which is coaxial with the two rotors and the left-hand end portion of which is sealingly installed in a flange-like support FL of the pump housing. The magnets 106 of the clutch M include a set of magnets at the outside of and a set of magnets within the can SR. The right-hand end portion of the single tube (tubular wall) of the can SR is sealed by an end wall or bottom wall 113. The character COV denotes a cover or lid which forms part of the pump housing and is adjacent the left-hand side of the flange FL. The arrows 108' denote a diverted flow of conveyed fluid medium 8; this flow is introduced into the interior of the can SR to lubricate the driven unit 104 and to be readmitted into the main stream of fluid medium 8 in the region of the axis of the impeller 105. The diverted flow can lubricate a plain bearing 112 which is provided on the bottom wall 113 of the can SR for the adjacent end portion of the driven unit 104.

It will be noted that the can SR includes a single tubular wall or tube. Such cans exhibit the aforediscussed drawbacks. The same holds true for cans having a single tubular wall and being installed in canned motor pumps wherein the driving unit is the stationary component of an electric motor and the driven unit is the rotor of such motor. Reference may be had, for example, to the single tube of the can 13 in German Offenlegungsschrift No. 27-54 840.

Figure 2:
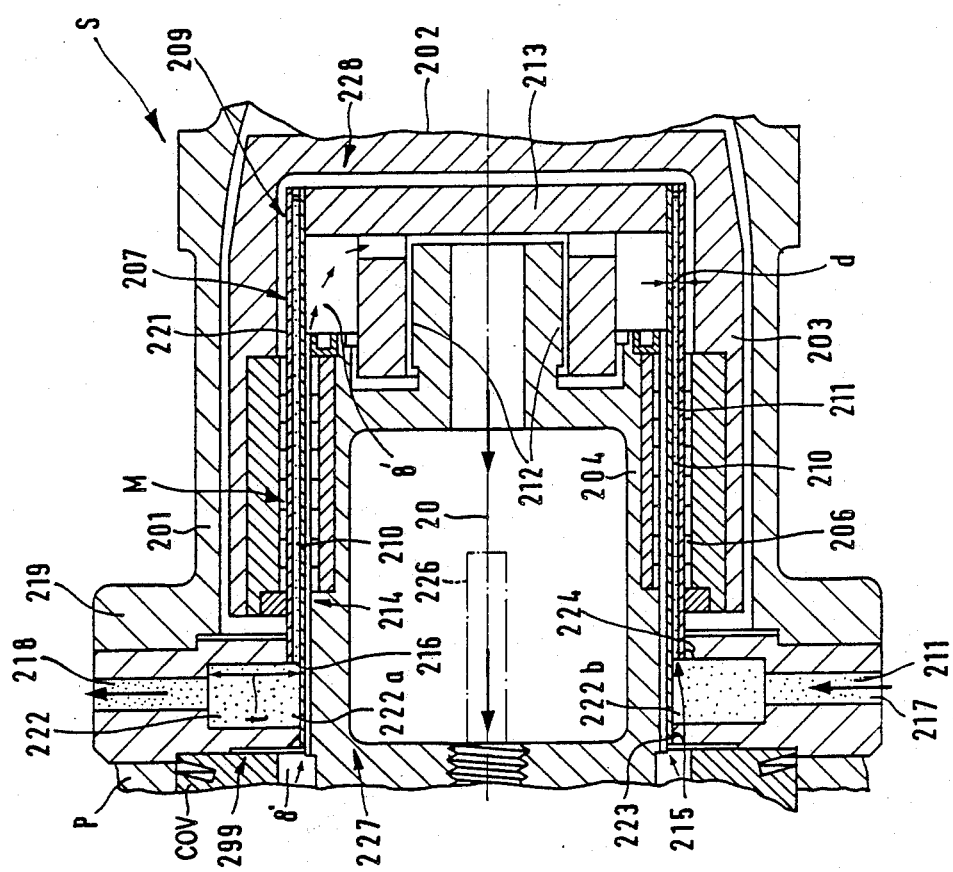
FIG. 2 is a fragmentary axial sectional view of a canned motor pump which embodies one form of the invention and wherein the driving unit rotates the driven unit by way of a magnetic clutch.

FIG. 2 shows a portion of a canned motor pump S which embodies one form of the present invention. The means 207 for hermetically sealing the driving unit 202-203 from the driven unit 204 of the pump S includes a novel and improved can 209 having an inner tubular wall or tube 214, an outer tubular wall or tube 221 and an end wall 213 at that (second) end 228 of the can 209 which is remote from the pumping element (not shown) corresponding to the impeller 105 of the conventional pump S' shown in FIG. 1. The tubes 214, 221 of the can 209 define an annular space 210 which receives a stream of a heat exchange fluid 211 (e.g., water or another liquid) by way of a fluid admitting nozzle or nipple 217 provided in a support means 219 constituting or resembling a flange at the left-hand (first) end 227 of the can 209 and forming part of the pump housing P. The flange or support means 219 is integral with a tubular extension 201 of the housing P, and such extension spacedly surrounds the rotor 203 of the driving unit 202-203 of the pump S. The heat exchange fluid 211 can be used to heat or cool the tubes 214, 221 of the can 209. A flow 8' of conveyed fluid medium is diverted from the main stream of such medium and is admitted into the can 209 by way of the cover COV of housing P to lubricate the plain bearing 212 which is provided at the inner side of the end wall 213 and surrounds the adjacent right-hand end portion of the rotor of the driven unit 204. The plain bearing 212 and the tubes 214, 221 of the can 209 are coaxial with the driving and driven units whose common axis is shown at 20. The end wall 213 can be said to constitute a bridge which heats or cools the plain bearing 212 for the driven unit 204. For example, the heat exchange fluid 211 which is circulated through the annular space 210 of the can 209 can be used to heat the flow 8', e.g., to liquefy or to lower the viscosity of the conveyed fluid medium in the interior of the can. As can be seen in FIG. 2, the diverted flow 8' is in direct contact with the internal surface of the inner tube 214. Heating of the flow 8' in the interior of the can 209 is often desirable in order to eliminate or reduce problems during starting of the pump S if the medium of the flow 8' is highly viscous or exhibits a tendency to solidify in the interior of the can. Such problems include damage to the can 209 and/or to the bearing 212 due to the absence of or due to unsatisfactory lubrication. Moreover, a reduction of viscosity of the fluid medium which forms the diverted flow 8' is often equally desirable when the pump S is in actual use (i.e., following starting of the pump) in order to reduce the viscosity of the flow and to thus enhance the lubricating characteristics of the fluid medium which is diverted into the interior of the can 209. Thus, a more satisfactory lubrication of the plain bearing 212 in the interior of the can 209 compensates, at least in part, for losses attributable to the utilization of a can having a plurality of tubular walls (214, 221) which are interposed between the two sets of magnets 206 of the clutch M serving to transmit torque from the driving unit 202-203 to the driven unit 204 of the pump S. In other words, by the simple expedient of heating the diverted flow 8' in the interior of the can 209, one can ensure that the efficiency of the pump S is not adversely affected by the provision of a relatively thick (multiwalled) can 209 between the driving and driven units. In fact, heating of the diverted flow 8' by the heat exchange fluid 211 which flows from the fluid admitting nipple or nozzle 217 toward and into a fluid-evacuating nipple or nozzle 218 of the flange 219 can actually enhance the efficiency of the pump S so that the efficiency is more satisfactory than that of a pump employing sealing means including a can having a single tubular wall (such as the can SR of FIG. 1).

The heat exchange fluid 211 will constitute a coolant if the pump S is to convey a medium whose temperature should not rise above a certain value. Alternatively, or in addition to such intentional cooling of the conveyed fluid medium, admission of a coolant into the annular space 210 of the can 209 can serve to compensate for heating of the can which is attributable to the development of eddy currents when the clutch M is operative to transmit torque from the rotor 203 of the driving unit 202-203 to the rotor of the driven unit 204. Heat which is withdrawn by the fluid 211 is evacuated along the path which is defined by the fluid evacuating nipple or nozzle 218 of the flange 219.

The annular space 210 of the can 209 has an inlet 215 at the left-hand end 227 of the can, and such inlet receives heat exchange fluid 211 by way of an arcuate channel section 222b which communicates with the bore of the fluid admitting nozzle 217. An outlet 216 of the space 210 is disposed diametrically opposite the inlet 215 and discharges spent (heated or cooled) heat exchange fluid 211 into an arcuate channel section 222a which communicates with the channel of the fluid evacuating nozzle 218. The channel sections 222a, 222b constitute two mirror symmetrical halves of a ring-shaped channel 222 which is machined into or otherwise formed in the flange 219 of the pump housing P. The flange 219 establishes a connection between the extension 201 around the rotor 203 of the driving unit 202-203 and the cover COV of the left-hand portion of the pump housing P, namely that portion which surrounds the pumping element receiving torque from the rotor of the driven unit 204. The left-hand end portions of the tubes 214 and 221 are fixedly and sealingly installed in the flange 219 and the right-hand end portion of the inner tube 214 is sealed by the end wall 213. The means for mechanically connecting the left-hand end portion of the outer tube 221 to the flange 219 comprises a welded seam 224, and a similar welded seam 223 serves to mechanically connect the left-hand end portion of the inner tube 214 to the flange 219. The inner tube 214 can be provided with a radially outwardly extending washer-like collar 299 which is disposed between the flange 219 and the cover or lid COV of the pump housing P.

The means for dividing the ring-shaped channel 222 of the flange 219 into the two mirror symmetrical arcuate channel sections 222a, 222b comprises guide means in the form of axially parallel ribs or partitions 225, 226 (see also FIGS. 3 and 4) each of which extends from the channel 222 all the way or close to the end wall 213 of the can 209. Such guide means direct the flow of heat exchange fluid from the channel section 222b toward the end wall 213 and thereupon from the end wall 213 toward the channel section 222a so as to ensure a more or less uniform heating or cooling of the entire tubular portion of the can 209. Thus, the guide means 225, 226 ensure that the heat exchange fluid 211 cannot flow from the admitting nozzle 217 into the evacuating nozzle 218 along the shortest path but is compelled to flow through the entire annular space 210 on its way from the inlet 215 toward and into the outlet 216, i.e., from the channel section 222b into the channel section 222a. Therefore, the heat exchange fluid 211 can also heat or cool the end wall 213 of the can 209. The guide means 225, 226 can constitute separately machined parts which are inserted into and fixedly secured to the can 209; this renders it possible to simplify the making of the flange 219 because the latter can be formed with a circumferentially complete channel 222 which is thereupon divided into channel sections 222a, 222b as a result of proper insertion of the guide means 225, 226.

The character d denotes the width of the annular space 210 in the radial direction of the tubes 214, 221 and the driven unit 204. This width is greatly exaggerated in FIG. 2 for the sake of clarity. In actual practice, the width d is in the range of 0.1 to 3 mm. If the width d is approximately 2 mm, the can 209 provides a path for the flow of a relatively large quantity of heat exchange fluid from the fluid admitting nozzle 217 to the fluid evacuating nozzle 218; however, such relatively wide space 210 contributes to the thickness of the can 209 and hence to a reduction of magnetic torque transmitting forces between the inner and outer sets of magnets 206 forming part of the clutch M. Results of experiments indicate that a stream of heat exchange fluid (such as hot steam or thermal oil) can greatly influence the temperature of the can 209 and of the region immediately adjacent the can when the width d of the annular space 210 between the tubes 214 and 221 is in the range of 0.1 to 0.5 mm. An advantage of such narrow annular space between the tubes 214, 221 is that the forces which are transmitted by the clutch M are influenced only negligibly or are not influenced at all, i.e., that the driving unit 202-203 can rotate the driven unit 204 as if the sealing means 207 between these units were made of, or were to contain, a can with a single tubular wall.

The periphery of the end wall 213 is welded to the adjacent end of the inner tube 214 (this can be readily seen in FIG. 3), and the right-hand end of the space 210 contains a ring which is welded to the adjacent ends of the tubes 214, 221 so as to seal the interior of the can 209 from the surrounding area.

FIGS. 5 and 6 show that the end wall 213 of the can 209 can comprise a plurality of panels 231, 232 which define a portion 233 of the space (210+233) within the can. The portions 210 and 233 of the internal space of the can 209 communicate with each other so that the heat exchange fluid which is admitted at 217 and is evacuated at 218 can adequately heat or cool the entire can 209 including the composite end wall 213 and the region of the sensitive plain bearing 229 for the driven unit of the pump. The guide means 225, 226 (not shown in FIGS. 5 and 6) then extend all the way to the composite end wall 213 and are designed to ensure predictable and adequate heating or cooling of the tubes 214, 221 as well as of the panels 231, 232 of the end wall 213.

Figure 4:
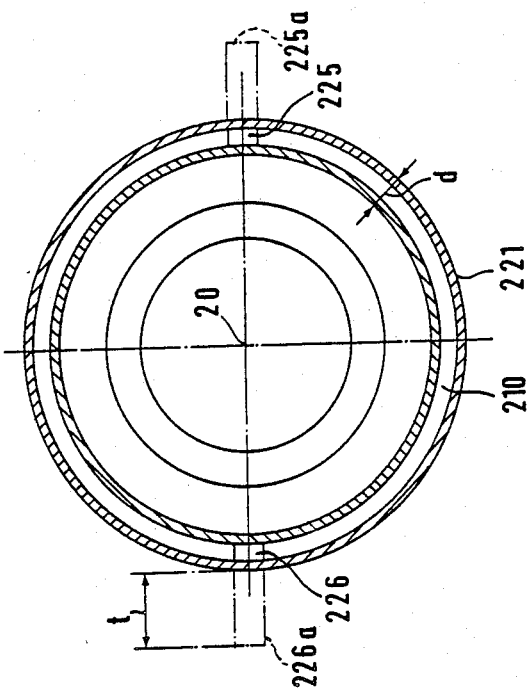
FIG. 4 is a transverse sectional view of the can as seen in the direction of arrows from the line IV—IV of FIG. 3.
Figure 8:
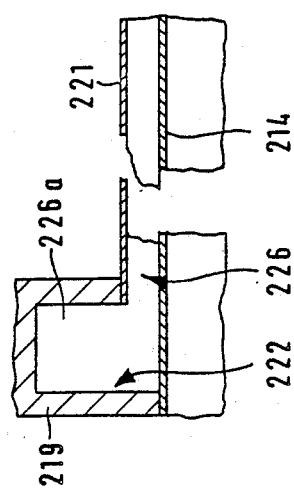
FIG. 8 is an enlarged fragmentary axial sectional view of a can which can be used in the pump of FIG. 2.

Referring again to FIGS. 3 and 4, there is shown a can 209 which constitutes a modification of the can 209 of FIG. 2. FIG. 4 shows radially outwardly extending projections or lugs 225a, 226a (indicated by phantom lines because they are optional) which extend into the channel 222 and constitute extensions of the respective guide means 225, 226 (the extension or projection 226a is also shown in FIG. 8). The width t of the projections 225a, 226a as measured in the radial direction of the can 209 shown in FIGS. 3 and 4 matches or approximates the width of the channel 222 in the region which is remotest from the pumping element (not shown in FIGS. 3 and 4). The projections 225a, 226a subdivide the channel 222 into the aforementioned sections 222a and 222b. Each of these sections extends along an arc of approximately 180 degrees in the circumferential direction of the tubes 214, 221 of the can 209.

The portion 236 of the space within the can 209 actually extends into a plain bearing 235 to thus ensure an even more uniform heating or cooling of the plain bearing and of the adjacent portion of the driven unit. The portion 236 can consist of discrete passages in the end wall 213, i.e., the latter need not be assembled of two or more panels but can constitute a single disc-shaped body with one or more channels or holes which together form the portion 236 of the space within the can 209. The same applies for the plain bearing 235, i.e., this bearing can be formed with channels to allow for the flow of heat exchange fluid therethrough.

The periphery of the inner panel 232 of the composite end wall 213 of FIGS. 5-6 is welded to the inner tube 214 by a seam 241. A similar welded seam 242 is employed to sealingly secure the outer panel 231 to the adjacent end of the outer tube 221. The panels 231, 232 are or can be parallel to each other to define a portion 233 of the composite space 210+233 which is of constant width. At least the outer panel 231 is relatively stiff so as to reduce the magnitude of bending forces acting upon the respective welded seam 242. Such bending forces develop in response to fluctuations of pressure at the one and/or the other side of the end wall 213.

Figure 3:
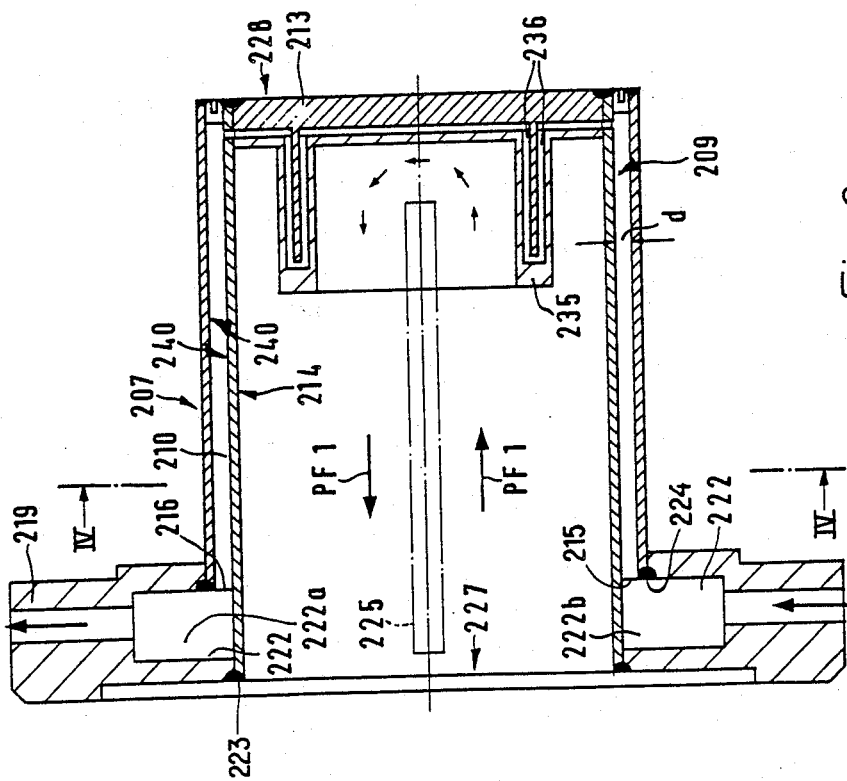
FIG. 3 is an axial sectional view of a can which constitutes a modification of the can in the pump of FIG. 2.

The width d of the space portion 210 between the neighboring surfaces 240 of the tubes 214, 221 shown in FIGS. 3 and 4 is greatly exaggerated for the sake of clarity. The arrows PF1 indicate the direction of circulation of a diverted flow of conveyed fluid medium in the interior of the can 209.

In FIGS. 5 and 6, the character 242 denotes a circumferentially complete welded seam between the periphery of the panel 231 of the end wall 213 and the adjacent end of the outer tube 221. A similar welded seam 241 is provided to sealingly secure the periphery of the panel 232 to the adjacent end of the inner tube 214.

The can 209 performs its basic function of forming part of the means (207) for hermetically sealing the driving unit 202-203 from the driven unit 204 as well as additional desirable and important functions, such as heating or cooling the region adjacent its walls 213, 214, 221, depending on the nature of the conveyed fluid medium. This renders it possible to reduce the force which is required to start the driven unit 204, especially if the conveyed fluid medium is a molten substance which tends to solidify or if such medium is a substance whose viscosity rises rapidly in response to a stoppage of the pump. Proper tempering of the fluid medium in the interior of the can 209 ensures satisfactory lubrication of the plain bearing 212, 235 or 229 and thus reduces the wear upon and prolongs the useful life of the bearing. Prevention of solidification or of a pronounced increase of viscosity of the conveyed fluid medium in the interior of the can 209, as well as adequate lubrication of the plain bearing in the interior of the can, is especially important in pumps of the type shown in FIG. 2, namely wherein the driven unit 204 receives torque by way of a clutch M. Such clutches will be incapable of transmitting torque if the resistance of the driven unit to rotation with the driving unit reaches a certain value at which the driving unit simply spins around the can 209 but is incapable of driving the unit 204 and the pumping element or elements. Under such circumstances, the magnetic force-transmitting connection between the two sets of magnets 206 (at the inner and outer sides of the composite tubular wall 214, 221) simply breaks and the driven unit remains idle even though the shaft 202 and the rotor 203 are positively driven.

If the fluid 211 is a coolant, its temperature at the inlet 215 of the annular space 210 can be selected in such a way that it can withdraw requisite quantities of heat from the can 209 so as to compensate for that heating of the can which is attributable to the development of eddy currents when the clutch M is in the process of transmitting torque from the rotor 203 to the rotor of the driven unit 204. The thus heated coolant can be used to heat the conveyed fluid medium if such heating is desirable or necessary. Still further, if the heat exchange fluid is a coolant, it can withdraw heat from the plain bearing 212, 235 or 229 so that the useful life of such bearing is longer, and the coolant can also maintain the diverted fluid medium (flow 8′ and arrows PF1) at a certain temperature or within an acceptable temperature range.

For example, if the temperature of the conveyed fluid medium should exceed 100°C. so that its viscosity is at an optimum value but the medium cannot stand temperatures above 150°., the heat exchange fluid can be admitted at a temperature of approximately 125°C. so that it heats the fluid medium if the latter is too cold and withdraws heat from the conveyed fluid medium if the latter is circulated at a temperature close to 150°C.. Such mode of tempering the conveyed fluid medium by appropriate selection of temperature of the heat exchange fluid can be resorted to in each embodiment of the improved pump.

If the inner tube 214 develops a leak, it merely permits the heat exchange fluid 211 to penetrate into the space for the driven unit 204 or permits the fluid medium to penetrate into the space 210 or 210+236; this still prevents an aggressive fluid medium from escaping into the atmosphere because the heat exchange fluid 211 is normally circulated (or can be circulated) along an endless path and passes through one or more heat exchangers which ensure that the temperature of such fluid is within the desired optimum range not later than at the inlet 215 of the annular space 210.

If the outer tube 221 develops a leak, this might result in some of the heat exchange fluid 211 escaping into the surrounding atmosphere; however, the fluid medium (which is normally much more likely to be toxic, corrosive or otherwise aggressive than the heat exchange fluid) is still prevented from escaping into the area around the pump, as long as the inner tube 214 remains intact.

The combined thickness of the tubes 214, 221 and of the annular space 210 between these tubes need not exceed (or need not appreciably exceed) the thickness of the tube SR which constitutes the can in the conventional pump S′ of FIG. 1. Therefore, the improved can 209 does not appreciably affect the ability of the clutch M to rotate the driven unit 204 in response to rotation of the driving unit 202-203.

The feature that the front ends of the tubes 214, 221 are welded or otherwise mechanically connected to the flange 219 is desirable in many instances because this enhances the rigidity and stability of the entire can 209. The axes of the tubes 214, 221 preferably coincide with the axis 20 of the driven unit 204.

It is further within the purview of the invention to provide the flange or support 219 with several nozzles 217 for admission of discrete streams of a suitable heat exchange medium, and with one or more means (218) for evacuating spent heat exchange medium from the interior of the can. The guide means 225, 226 are desirable because they reduce the likelihood of non-uniform heating or cooling of the can 209 and thus reduce the likelihood of development of appreciable thermally induced stresses which could cause distortion of and/or other damage to the can. The provision of one or more spaces in the end wall 213 of the can 209 is optional but advantageous because this even further enhances the uniformity of the heating and cooling action and ensures adequate heating or cooling of the bearing 212, 235 or 229 as well as adequate heating or cooling of the fluid medium in the space within the inner tube 214. The provision of one or more spaces in the end wall 213 is desirable on the additional ground that the can 209 can confine a relatively large quantity of heat exchange fluid so that the fluid need not be circulated at a high speed and/or that the heating or cooling action is not only more uniform but also much more pronounced than if the fluid were to circulate only between the tubes 214 and 221. Still further, the provision of one or more paths for the flow of heat exchange fluid within the end wall 213 renders it possible to influence the temperature of the pump all the way to the region of the front end of the shaft 202.

The heat exchange fluid 211 which is circulated in the interior of the can 209 can be selected in such a way that it does not affect the characteristics of the fluid medium which is being conveyed by the improved pump. For example, if the conveyed fluid medium is a flowable substance which does not tend to solidify in the interior of the can in response to temporary stoppage of the pump and whose viscosity will not be unduly increased in response to temporary stoppage of the pump but which should not be contacted by any non-compatible substances, the heat exchange fluid is selected with a view to ensure that it does not contaminate, dilute and/or otherwise undesirably influence the conveyed fluid medium in response to the development of a leak in the inner tube 214 so that the fluid medium can flow into the space 210. For example, the composition of the heat exchange fluid in pumps which are used to convey such fluid media can be the same as that of conveyed fluid medium. In such pumps, the heat exchange fluid can constitute a diverted stream of fluid medium, and the diverted stream is or can be caused to pass through a heat exchanger (heater or cooler) in a secondary circuit before it is admitted into the interior of the can. Alternatively, the composition of the heat exchange fluid can deviate from that of the conveyed fluid medium; however, the two fluids should be sufficiently compatible (e.g., as far as their vicosities and temperatures are concerned) to ensure that the conveyed fluid medium need not be discarded or regenerated in response to the development of a leak in the inner tube so that the fluid medium is free to penetrate into the space for the heat exchange fluid. All that counts then is to ensure that the outer tube 221 of the can 209 continues to establish and maintain a hermetic seal between the driving and driven units and prevents the conveyed fluid medium from escaping into the surrounding atmosphere.

Figure 7:
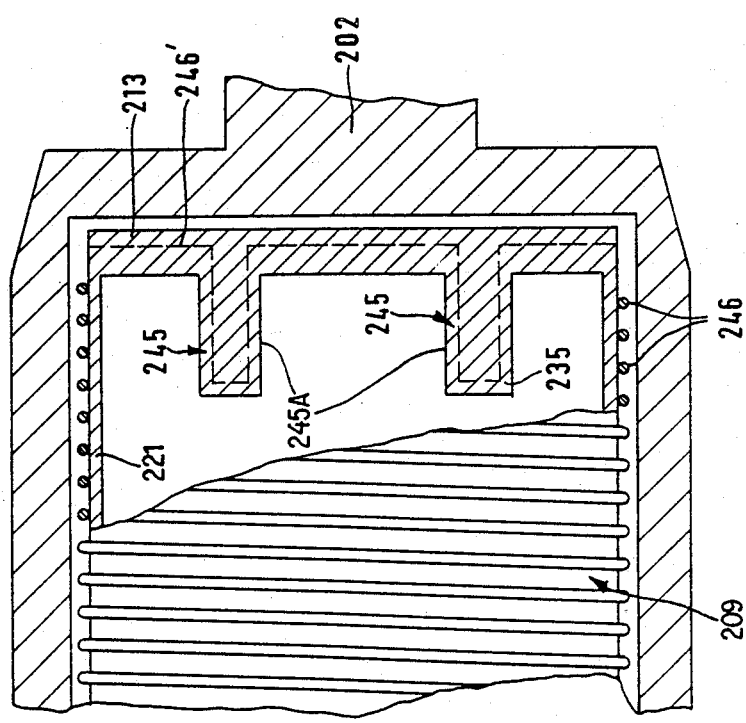
FIG. 7 is a fragmentary axial sectional view of a pump wherein the can is heated by an electric heating device.

FIG. 7 shows, very schematically, a different mode of heating (tempering) the can 209 and the bearing 235 of its end wall 213. The illustrated can 209 has a single tubular wall or tube 221; however, it is equally possible to employ a similar heating arrangement for cans which are constructed in a manner as shown in FIGS. 2-6, i.e., with at least two concentric tubes which define an annular space 210 or an annular portion of a composite space further including one or more spaces in the end wall. The can 209 of FIG. 7 is heated by electric heating means 245 having one or more wire-like heating elements 246 which surround and can be at least partially recessed into the tube 221. The manner in which the element or elements 246 are connected or connectable with a suitable source of electrical energy is not shown in FIG. 7. The illustrated heating elements 246 can constitute a single length of convoluted wire or they can form a series of discrete convolutions which are connected in parallel. The arrangement is preferably such that the convolutions or rings of heating elements 246 are equidistant from each other in the axial direction of the tube 221. The purpose of at least partially recessing the heating means 245 into the can 209 is to reduce the likelihood of damage to the heating elements 246. The heating elements 246 need not be recessed into the wall or walls of the can 209 if they are installed in the annular space (such as 210 in FIG. 2) between a pair of concentric tubular walls or tubes.

FIG. 7 further shows that the electric heating means 245 can also serve to heat the bearing 235 at the inner side of the end wall 213. That portion of the heating means 245 which is used to heat the bearing 235 is or can be fully recessed into the bearing (this is indicated in FIG. 7 by a broken line 245A). Additional heating element means 246' of the heating means 245 can be recessed into the end wall 213, i.e., the heating means 245 can be designed to heat only the tube or tubes of the can 209, to heat only the bearing 235, to heat only the end wall 213, to heat the tube or tubes and the bearing, to heat the tube or tubes and the end wall, to heat the end wall and the bearing or to heat the tube or tubes, the end wall and the bearing. It often suffices to heat the tube or tubes and the end wall 213 because the latter can heat the bearing 235.

It is also possible to employ the electric heating means 245 or analogous electric heating means in or with a can of the type wherein a heat exchange fluid is caused to circulate and to heat or cool the can and the surrounding area. The electric heating means can complement the heating action or counteract the cooling action of the heat exchange fluid so that the temperature of the can and of the surrounding area can be regulated with an even higher degree of accuracy and predictability.

Still further, a heat exchange fluid can be used to heat or cool a certain portion of the can (such as the tubes 214, 221 of the can 209 shown in FIG. 2), and electric heating means can be used to heat one or more additional portions of the can (e.g., the end wall 213 and/or the bearing 212, 235 or 229 which may not be as readily heatable by a fluid as the tubes 214, 221).

Figure 9:
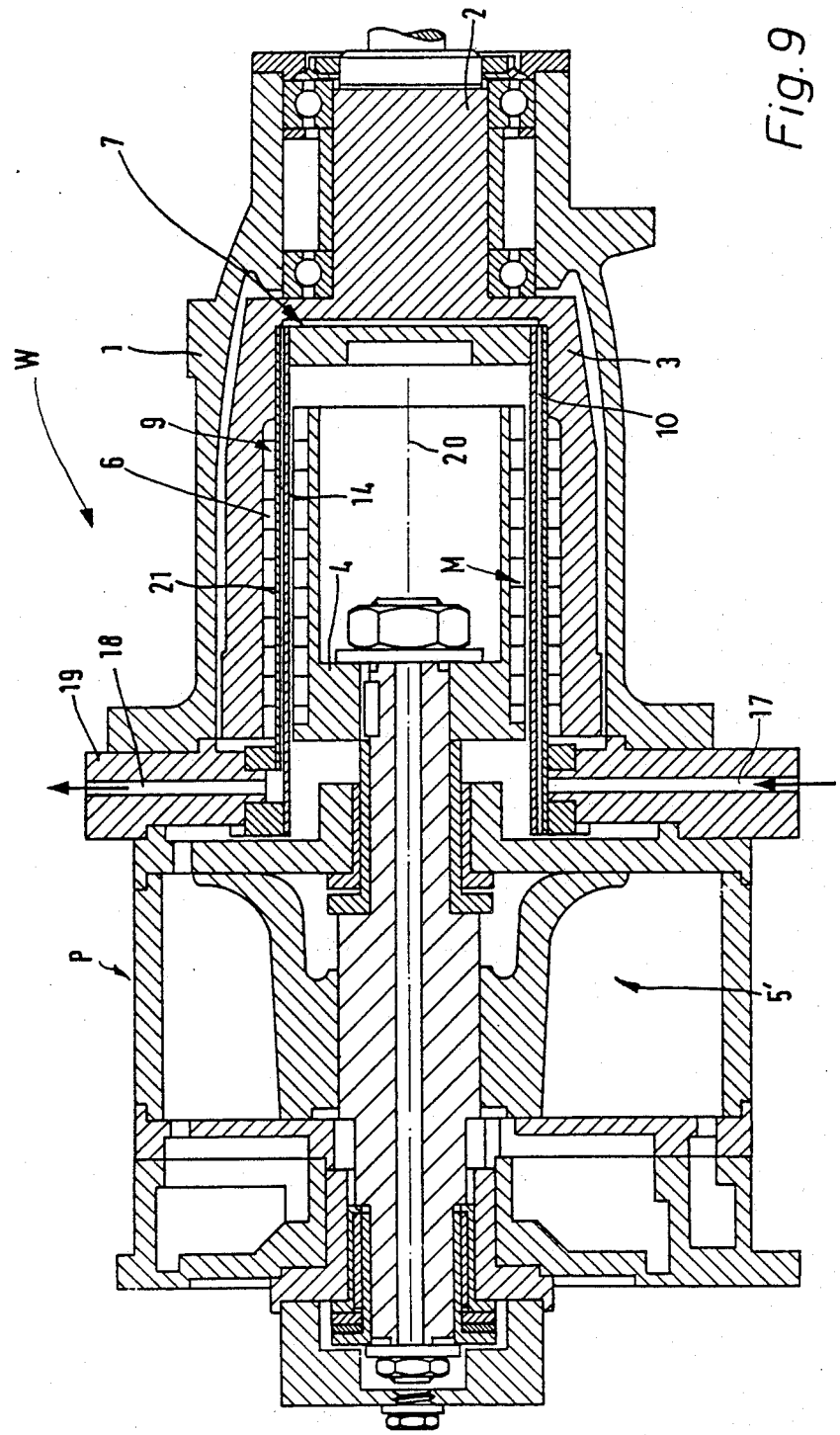
FIG. 9 is an axial sectional view of a liquid ring pump which embodies the improved can.

FIGS. 2-6 show several embodiments of a canned motor pump wherein the pump is a centrifugal pump. However, the improved can can be used with equal or with similar advantage in other types of pumps, for example, in positive displacement pumps including so-called water ring pumps or liquid ring pumps W of the type shown in FIG. 9. The pump W comprises a sealed pump housing P with a star-shaped pumping element or impeller 5' mounted on a shaft which receives torque from a driven unit 4. The latter is rotated by a driving unit (including a motor-driven shaft 2 and a hollow cup-shaped rotor 3) through the medium of a clutch M having two sets of magnets 6, namely a set of magnets in the rotor 3 and a set of magnets in the driven unit 4. The sealing means 7 of the pump W includes a can 9 which is or which can be similar to the can 209 of FIG. 2 (it has an inner tube 14 and an outer tube 21) except that it does not have or need not have a plain bearing for the right-hand end portion of the driven unit 4. The extension 1 which surrounds the rotor 3 and contains the antifriction bearings for the shaft 2 is connected to the main portion of the pump housing P by a flange-like support 19 which is provided with the nozzles 17, 18 for admission and evacuation, respectively, of a suitable heat-exchange fluid (such as water, steam, oil or the like). The heat exchange fluid is caused to flow through the entire (or through the major part of the) internal space (note the annular space 10) of the can 9. The character 20 denotes the common axis of the driving and driven units.

The can 50 of FIG. 10 not only performs its basic function of forming part of the means for sealing a driving unit 3 from a driven unit 54 but also the additional important function of reducing the likelihood of escape of conveyed fluid medium into the surrounding area. This is due to the provision of at least two tubular walls or tubes 60, 61 defining an annular space 62 for circulation of a heat exchange fluid in a direction from an admitting nozzle 217 to an evacuating nozzle 218. The can 50 further reduces the likelihood of escape of heat exchange fluid (e.g., a very hot fluid) into the surrounding area.

The left-hand ends of the tubes 60, 61 are sealingly received in a flange-like support 19 of the pump housing, and the right-hand ends of these tubes are sealingly received in a flange-like support 19' at the rear or second end of the can 50. The heat exchange fluid flows from the admitting nozzle 217 in the support 19 toward and into the path which is defined by the evacuating nozzle 218 in the support 19'. This ensures uniform heating or cooling of the entire can 50 so that the guide means 225, 226 can be omitted. However, it is equally possible to employ the guide means 225, 226 and/or other guide means to even further uniformize the rate of heating or cooling of the entire can 50.

The clutch is omitted because the driving unit 3 and the driven unit 54 of the canned motor pump SPM of FIG. 10 together constitute an electric motor or include parts which together constitute an electric motor. The driving unit 3 of the motor SPM is a stator including windings 56 and laminations 55, and the driven unit 54 includes a rotor mounted on a shaft 53 which transmits torque to the pumping element or elements 105 of the pump. The pumping element or elements 105 can constitute the impeller or impellers of a centrifugal pump. The sealing means between the stationary driving unit 3 and the driven unit 54 includes the can 50 which has the aforementioned inner and outer tubes 60 and 61; these tubes define the annular space 62. The character 84 denotes a safety jacket or receptacle which surrounds the stator elements 55, 56 of the driving unit 3 and can be said to form part of the composite pump housing. The jacket 84 includes a cylindrical shell 81 and two end walls 82, 83 at the rear and front ends of the shell. The pump housing further includes the flange-like supports 19 and 19' for the front and rear ends of the tubes 60, 61. The jacket 84 serves to prevent escape of the conveyed fluid medium in the event of damage to the can 50. The shell 81 carries a sleeve-like member 85 which surrounds a cable 85A serving to connect the stator windings 56 with a suitable energy source, not shown. The member 85 contains a plastic insert 80 which sealingly surrounds the corresponding portion of the cable 85A and prevents escape of the conveyed fluid medium in the event of damage to the can 50. Similar plastic inserts 86 are provided in the interior of the shell 81 adjacent the end walls 82 and 83 of the jacket 84, i.e., at the two ends of the stator chamber 87. The utilization of plastic inserts in the protective jacket of a canned motor pump is known per se, i.e., such jackets and inserts are also used in pumps wherein the can has a single tubular wall. These safety features are quite satisfactory for a certain period of time; however, it has been found that the provision of a jacket and of plastic inserts therein cannot prevent escape of the conveyed fluid medium after a long interval of use of a pump having a conventional can, i.e., a can with a single tubular wall.

The arrows Pf1 denote in FIG. 10 the direction of flow of diverted fluid medium through the interior of the can 50 to lubricate the driven unit 54 and the shaft 53. The latter has an axial bore for return flow of diverted fluid medium into the chamber for the pumping element or elements 105. The axis of the shaft 53 is shown at 20.

As a rule, the inner tube 61 of the can 50 is most likely to be damaged when the pump SPM of FIG. 10 is in use. Any damage to the inner tube 61 enables the often highly aggressive conveyed fluid medium to flow from the space within the inner tube 61 into the annular space 62 between the tubes 60, 61 and to leave the can 50 at 218. However, and since the can 50 comprises several tubes, any damage to the inner tube 61 does not entail a flow of such aggressive fluid medium into the stator chamber 87 because the outer tube 60 constitutes a barrier against penetration of any fluids from the space 62 into the chamber 87. Therefore, the laminations 55 and/or the windings 56 of the driving unit 3 in the chamber 87 are not likely to be damaged in automatic response to penetration of conveyed fluid medium from the space within the inner tube 61 into the annular space 62 of the can 50. Moreover, the outer tube 60 cooperates with the plastic inserts 80, 86 in the stator chamber 87 and with the jacket 84 to prevent escape of an aggressive fluid medium into the surrounding area. This is of considerable importance if the conveyed medium is a toxic substance, a highly corrosive substance or any other substance which could cause damage and/or injury if permitted to escape into the area around the jacket 84.

In each of the embodiments which are shown in FIGS. 2 to 10, the can 209, 9 or 50 is designed in such a way that it can be installed or removed in its entirety, i.e., all parts of such can must be inserted into or removed from the pump housing as a unit, normally with the support or supports for the walls of the can. This simplifies the assembly of the canned motor pump because the can forms a prefabricated module which is then simply installed in the housing. However, it is often desirable to construct and assemble the can in such a way that certain parts of the can and/or of the support means therefor can be salvaged for further use, e.g., in the event that one of the tubular walls develops a leak or is otherwise damaged and must be removed for the purposes of repair or replacement by a fresh tubular wall. FIG. 11 shows a canned motor pump SPM wherein the shaft 53 for the pumping element or elements is driven by an electric motor including a driving unit having stator elements 55, 56 and a driven unit or rotor 54, and wherein the can 50 is constructed and assembled in such a way that at least one of its constituents can be installed or removed independently of the other constituent or constituents. In the embodiment of FIG. 11, the separately insertable or removable constituent is the inner wall 61' of the can 50. That end of the inner tube 61' which is nearer to the pumping element or elements on the shaft 53 has a radially outwardly extending collar 71 (FIG. 12). The other end of the inner tube 61' is provided with a radially inwardly extending collar 72 (FIG. 13). The shaft 53 is rotatable in plain or friction bearings 64 and 65; the latter is mounted in a seat 73 which is installed in the end wall 82 of the jacket 84, i.e., at that end of the can 50 which is remote from the pumping element or elements. The seat 73 is centered by a closure 74 which is secured to the end wall 82 and to the seat 73 by screws 77 and 75, bolts or analogous fastener means. The cover 74 has a centering recess 73b for a stub 63a of the seat 73. Sealing elements (not specifically shown) can be installed between the parts 73, 74, 82 to prevent leakage of conveyed fluid medium and/or heat exchange fluid into the surrounding area.

FIG. 13 shows that the radially inwardly extending collar 72 of the inner tube 61' is sealingly and clampingly received between the seat 73 and the closure or cover 74. The collar 72 is a separately produced element which is secured to the respective end of the inner tube 61' by a welded ring-shaped seam 69 (FIG. 13).

Figure 14:
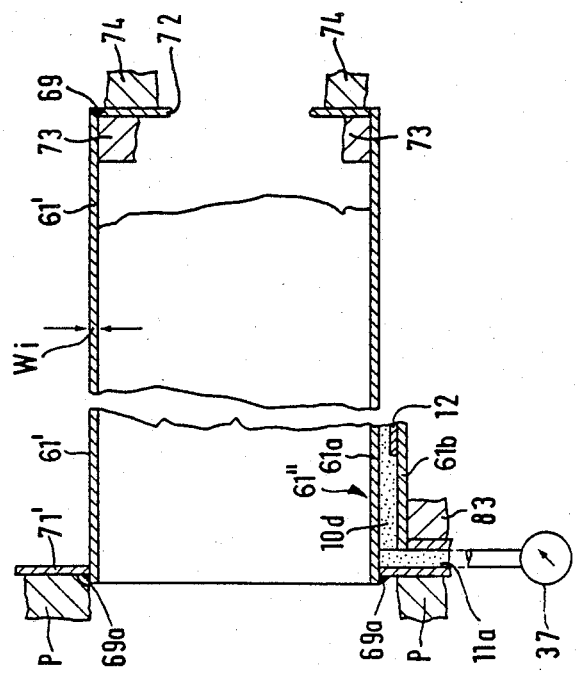
FIG. 14 is a fragmentary axial sectional view of a further can wherein the inner tube comprises a plurality of concentric tubular sections.

As shown in FIG. 12, the radially outwardly extending collar 71 of the inner tube 61' has an annular recess 79 to provide room for a ring-shaped welded seam 76 which connects the front end of the outer tube 60 with a radially outwardly extending collar 67. A further welded seam 69a is provided to sealingly secure the separately produced collar 71 to the inner tube 61' FIG. 14 shows a relatively thin radially outwardly extending collar 71' which replaces the collar 71 of FIG. 12 and does not have a recess; the collar 71' is secured to the respective end of the inner tube 61' by a welded seam 69a, the same as in the embodiment employing the collar 71. If desired, only a certain portion of the collar 71 or 71' extends exactly or substantially radially of the tube 61'. The collar 71' of FIG. 14 is slightly offset from the left-hand end face of the tube 61' to provide room for the seam 69a, i.e., this seam surrounds the tube 61'.

Referring again to FIG. 11, the character 219 denotes the support or flange at the first or left-hand end of the can 50. This support is provided with the nozzle 217 which admits the heat exchange fluid into the adjacent end of the annular space 62 between the tubes 60 and 61' of the can 50. The fluid evacuating nozzle 218 is provided in the support or closure 74 at the second end of the can 50 so that the entire can is adequately heated or cooled by fluid which flows from the nozzle 217 toward and into the path which is defined by the nozzle 218.

If the inner tube 61' is damaged or requires inspection or replacement for another reason, the operator proceeds as follows: The cover 74 is detached from the seat 73 and from the end wall 82 by removing the fasteners 75 and 77. In the next step, the jacket 84 is slipped off the outer tube 60 with the stator elements 55, 56 therein. In a further step, the outer tube 60 is slipped off the inner tube 61' and the inner tube 61' is then ready to be slipped off the driven unit 54. The seat 73 is then separable from the tube 61'.

It is preferred to separably assemble the walls of the can 50 in such a way that welded seams need not be destroyed in order to remove the tube 61' and that no welded seams must be formed for the purpose of inserting a fresh inner tube. This is particularly important if the welded seams must be formed with a very high degree of accuracy which is the case in many types of canned motor pumps. Moreover, such absence of the need for the destruction and for the making of welded seams is important when the improved pump is used in developing countries or at any location where qualified labor to carry out such specialized work and/or the equipment for carrying out the work is not readily available.

The outer tube 60 of the can 50 which is shown in FIGS. 11 to 13 is substantially H-shaped. The tubular part which surrounds the inner tube 61' is the crossbeam of the H and the two parallel legs of the H are formed by two radially outwardly extending collars 67, 68 which are welded to the respective ends of the tubular part of 60 by ring-shaped welded seams 76. The radially innermost portions of the collars 67, 68 can constitute short cylinders (shown in FIG. 15 at 57 and 58) which directly surround the tubular part and are welded thereto by the corresponding seams 76.

The wall thickness of the tubes 214, 221, 60, 61 and 60, 61' can be the same, the inner tubes can be thinner than the outer tubes or the inner tubes can be thicker than the outer tubes. This holds true for pumps wherein the driven unit receives torque by way of a clutch as well as for pumps wherein the driven unit is or includes the rotor of an electric motor. The thickness of the inner and/or outer tubes will depend on the intended use of the pump. For example, and referring to the pump SPM of FIGS. 11 to 13, the thickness Wa of the outer tube 60 will depend upon the pressure of fluid medium which is being conveyed by the pump, i.e., the outer tube 60 should be capable of withstanding such pressure by itself in the event of damage to the inner tube 61'. In most instances, the thickness Wa need not exceed 0.5 mm. The reason that the outer tube 60 of the pump SPM which is shown in FIGS. 11 to 13 is not designed as a separable part is that, based on extensive tests in actual use, the outer tube is not likely to be damaged when the pump is in use. If the outer tube 60 is damaged, it can be replaced jointly with the stator elements 55, 56 and the parts 81–83 of the jacket 84.

The wall thickness Wi of the inner tube 61' shown in FIG. 11 can be less than Wa, as long as the tube 61' can stand the anticipated pressure of conveyed fluid medium without any deformation or with a relatively small deformation (preferably with negligible deformation). The inner tube 61 or 61' is likely to be damaged as a result of damage to the plain bearing 64 and/or 65 for the rotor 54. The inner tube 61' is then replaced in a manner as described above in connection with the tube 61' of FIG. 11, i.e., the cover 74 is removed, the jacket 84 is removed with the stator elements 55, 56 and outer tube 60, and the inner tube 61' is then removable to be replaced with an intact inner tube. Such removal of the inner tube 61' and the reinsertion of a fresh inner tube can take place without any destruction of welded seams and without the need for the making of fresh welded seams at the locus of use of the pump.

The cover 74 centers the seat 73 at 63b.

A further embodiment of the improved canned motor pump is shown at SPM' in FIGS. 16 to 19. The driven unit and portions of the stator elements are omitted for the sake of clarity. The omitted parts can be similar to or identical with the corresponding parts of the electric motor in the pump SPM of FIGS. 11 to 13. The pump housing P surrounds a pumping element 5 in the form of an impeller forming part of a centrifugal pump and serving to force the fluid medium 8 to flow radially outwardly, i.e., from the axis 20 toward the periphery of the impeller when the latter is driven by the shaft 53 which receives torque from the driven unit of the electric motor in the motor housing MG including the shell 81 and the end walls 82, 83 of the safety jacket corresponding to the jacket 84 of FIG. 11. A portion of the conveyed fluid medium 8 is caused to flow in the direction of arrows Pf10, i.e., through the interior of the can 50 which defines an annular space 62 for a heat exchange fluid which is admitted via nozzle 217 at the first end and leaves the space 62 via nozzle 218 at the second end of the can 50. The diverted portion of the fluid medium 8 is directed into the space at the right-hand end of the shaft 53 and returns into the range of the impeller 5 by way of an axial bore or hole 27 in the shaft 53. The returned fluid medium enters a low-pressure portion of the pumping chamber.

Figure 16:
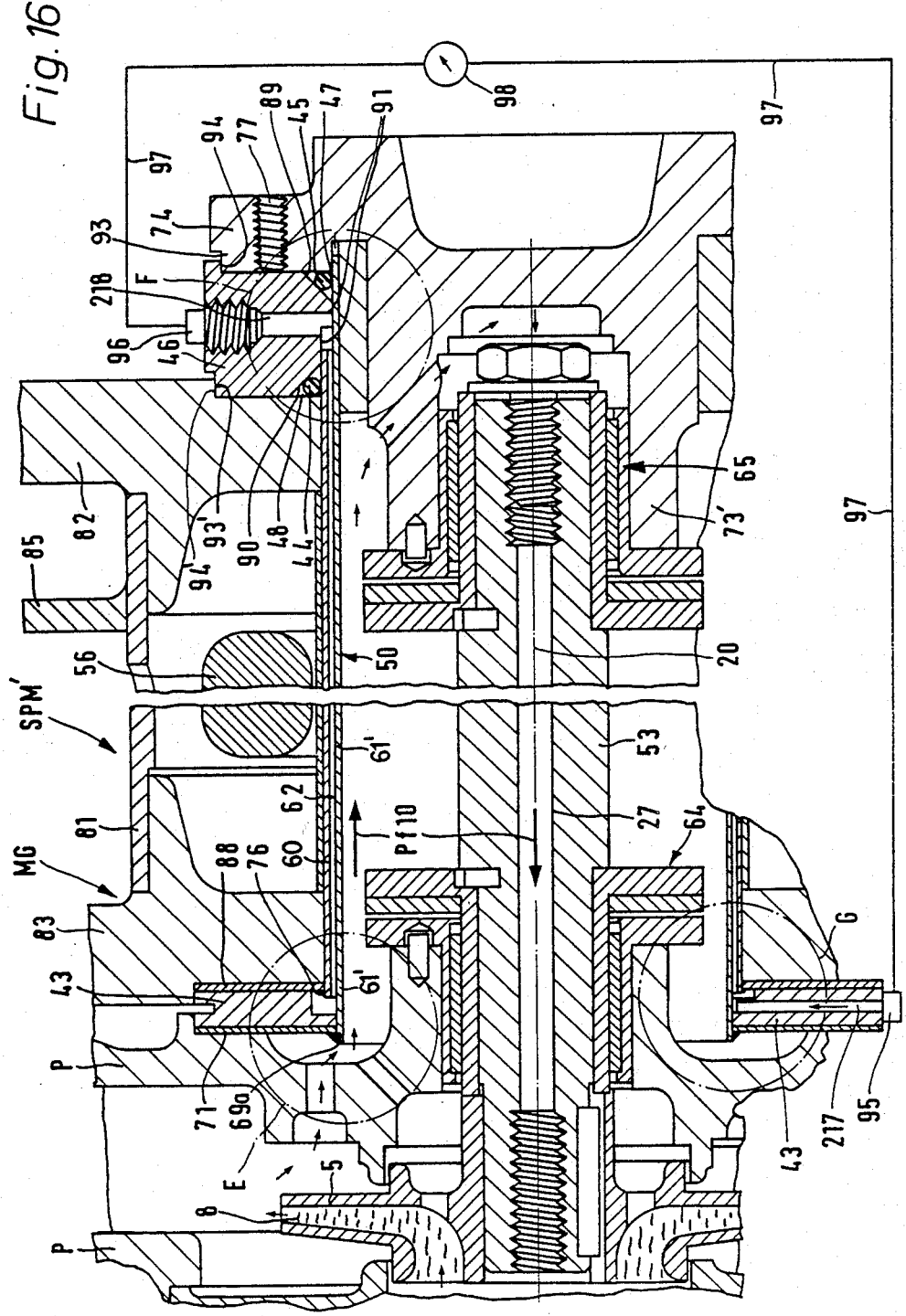
FIG. 16 is a fragmentary axial sectional view of a canned motor pump which constitutes a further modification of the pump shown in FIG. 10 or 11.
Figure 19:
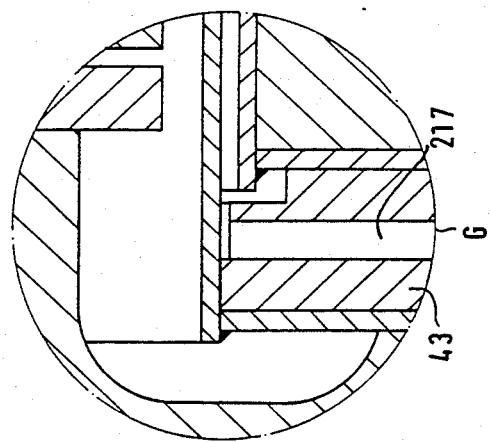
FIG. 19 is an enlarged view of a detail within the phantom-line circle G in the lower left-hand portion of FIG. 16.
Figure 18:
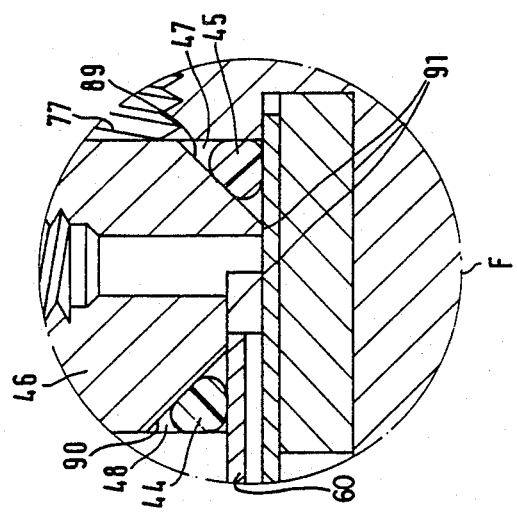
FIG. 18 is an enlarged view of a detail within the phantom-line circle F in the upper right-hand portion of FIG. 16.
Figure 17:
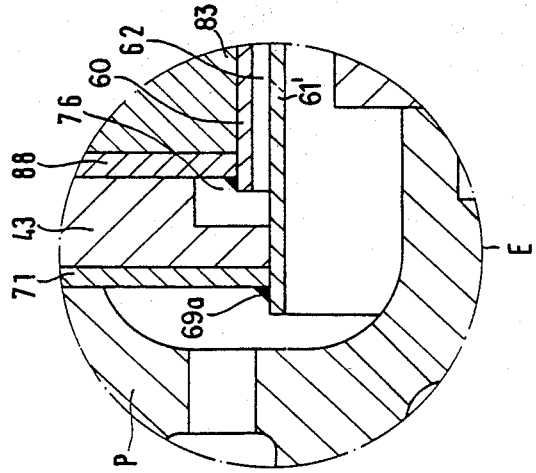
FIG. 17 is an enlarged view of a detail within the phantom-line circle E in the upper left-hand portion of FIG. 16.

As shown in FIGS. 16 and 17, the left-hand end of the inner tube 61' is again provided with a radially outwardly extending collar 71 which is sealingly secured thereto by a welded seam 69a. A similar radially outwardly extending collar 88 is secured to the left-hand end of the outer tube 60 by a welded seam 76. A flange-like support 43 is disposed between the collars 71 and 88, and the parts 71, 43 and 88 are sealingly clamped between the pump housing P and the motor housing MG. The collar 88 is actually recessed into the adjacent end face of the end wall 83 forming part of the safety jacket of the motor housing MG. The nozzle 217 which admits the heat exchange fluid into the annular space 62 of the can 50 is provided in the support 43. A second flange-like support 46 is provided at the second end of the can 50 and has a stepped axial hole or bore 91 for the respective ends of the tubes 60 and 61'. The nozzle 218 for evacuation of heat exchange fluid is provided in the support 46.

The right-hand ends of the tubes 60 and 61' are not provided with any (radially inwardly or outwardly extending) collars; they are slidable in the corresponding portions of the stepped hole 91 in the support 46 and are respectively surrounded by ring-shaped elastic sealing elements 44 and 45 which are in sealing engagement with the external surfaces of the respective tubes 60, 61' as well as with the adjacent chamfered surfaces 90, 89 of the support 46. The outlet of the space 62 is disposed between the sealing elements 44, 45 so that it is free to admit spent heat exchange fluid into the nozzle 218. The chamfered surfaces 90, 89 and the adjacent portions of the external surfaces of the tubes 60, 61' define annular compartments 48, 47 for the respective sealing elements 44, 45. The sealing element 44 is further maintained in sealing engagement with the end wall 82, and the sealing element 45 is kept in sealing engagement with the closure or cover 74. This can be seen in FIG. 18.

An advantage of the pump SPM' of FIGS. 16 to 19 is that each of the tubes 60, 61' can be removed independently of the other and that each of these tubes can be replaced with a fresh tube without the need for any welding or weld-destroying equipment. The outer tube 60 can be removed jointly with the respective collar 88, and the inner tube 61' can be removed jointly with the respective collar 71. The removal of a damaged tube 60 or 61', and the insertion of a fresh tube 60 or 61' is simplified if the collars 71, 88 are adjacent the first end of the can 50 (i.e., close to the pumping element or elements 5) and if the collar-free ends of the tubes 60, 61' (together with the sealing elements 44, 45) are adjacent the second end of the can. However, it is equally within the purview of the invention to place the support 46 and the sealing elements 44, 45 next to the pumping element 5 and to install the support 43 and the collars 71, 88 adjacent the cover or closure 74. The latter has an integral seat 73' for the bearing 65.

The aforediscussed selection of the width of the annular space 210 between the inner and outer tubes 214, 221 of the improved can 209 also applies for the width of the annular space 10 or 62 between the inner and outer tubes of the can 9 or 50. Thus, such width can be in the range of 0.1 to 0.5 mm. The width of the spaces 10 and 62 is exaggerated in the corresponding Figures for the sake of clarity (note, for example, FIG. 17 which shows a relatively wide annular space 62). As also mentioned above, an important advantage of a relatively narrow annular space 210, 10 or 62 is that the presence of such annular space does not entail an appreciable reduction of the magnitude of the force with which the outer magnets of the clutch M or the stator elements of the electric motor rotate the driven unit of the respective canned motor pump. At any rate, the reduction of torque due to the presence of several tubes and of one or more annular spaces is more than offset by the aforediscussed important advantages of the utilization of a can which has an internal space for the circulation of a heat exchange fluid.

FIG. 16 shows that the right-hand end face of the end wall 82 of the jacket 81–83 has a recess bounded by a ring-shaped shoulder 93' which centers a projecting portion or stub 94' of the support 46. The support 46 has a recess surrounded by an annular centering shoulder 94 for a stub 93 of the cover 74. Such centering of the parts 74 and 46 relative to the end wall 82 and relative to each other ensures that the bearing 65 for the driven unit of the electric motor in the pump SPM' of FIGS. 16–19 does not wobble when the pump is in use. An additional advantage of the pump SPM' of FIGS. 16–19 is that the collars 71, 88 and support 43 can be tightly clamped between the pump housing P and motor housing MG without any deformation of the tubes 60, 61' because the right-hand end faces of these tubes are spaced apart from the nearest radially extending portions of the support 46 and cover 74, i.e., the right-hand ends of the tubes 60, 61' are sealingly engaged by the respective sealing elements 44, 45 but these tubes are not subjected to any axial (buckling or flexing) stresses.

All other parts of the pump SPM' which are shown and referenced but not specifically mentioned herein correspond to the similarly referenced parts of the pump SPM shown in FIGS. 11 to 13.

FIG. 16 further shows leak detector means which can furnish visual and/or other indications of the presence of eventual leaks in the means for circulating the heat exchange fluid through the annular space 62 in the can 50. A first flow meter 95 of the leak detector means is installed at the intake end of the fluid admitting nozzle 217 to monitor the rate of flow of heat exchange fluid into the space 62, and a second flow meter 96 is provided at the discharge end of the fluid evacuating nozzle 218. These flow meters transmit signals via conductors 97 to an evaluating means 98 including a gauge which indicates the differences, if any, between the rate of admission of heat exchange fluid at 217 and the rate of evacuation of heat exchange fluid at 218. The flow meters 95, 96 can be replaced with pressure gauges or used jointly with pressure gauges. All that counts is to provide means which can detect the presence of leaks and generates visible, audible and/or other types of signals, at least in the event of leakage of heat exchange fluid into the surrounding area or into the interior of the pump. If the parts 95, 96 constitute or are used jointly with pressure gauges, the evaluating means 98 is calibrated to take into account the normal drop of pressure of fluid which is caused to flow from 217 to 218.

As a rule, the pressure within the confines of the inner tube 61' deviates from the pressure in the space 62; therefore, if the inner tube 61' develops a leak or is damaged in any other way which enables the heat exchange fluid to flow from the space 62 into the space within the inner tube 61' or vice versa, the evaluating means 98 generates a signal which informs the attendant or operator that the inner tube 61' must be replaced. The evaluating means 98 can generate a visible signal and/or it can automatically arrest the pump SPM' by disconnecting the stator elements 56 from the energy source.

If the parts 95, 96 are or include flow meters, the rate of fluid flow from the nozzle 217 to the nozzle 218 changes noticeably when the inner tube 61' develops a leak, i.e., if the heat exchange fluid can flow into the space for the rotor of the driven unit or if the diverted stream (arrows Pf10) of conveyed fluid medium can penetrate into the space 62; this causes the evaluating means 98 to generate a visible and/or audible signal and/or a signal which is used to arrest the pump SPM'. The evaluating means 98 is preferably designed to respond to an undue increase as well as to an undue drop of pressure in the path for the flow of heat exchange fluid from 217 to 218.

Analogous leak detector means can be provided in all other embodiments of the improved canned motor pump.

Figures 20, 21:
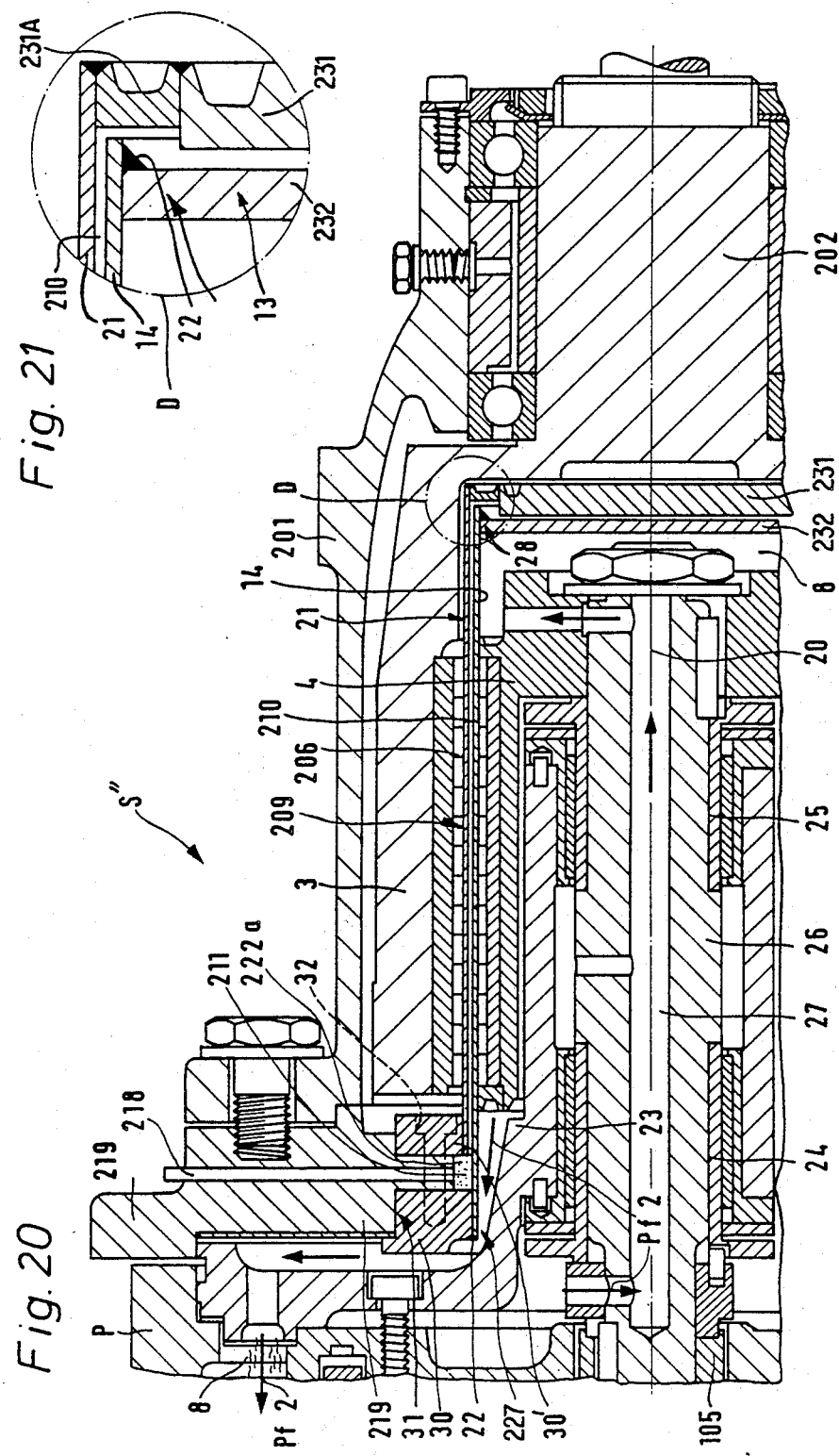
FIG. 20 is a fragmentary axial sectional view of a canned motor pump which constitutes a modification of the pump shown in FIG. 2.
FIG. 21 is an enlarged view of the detail within the phantom-line circle D in the right-hand portion of FIG. 20.

FIG. 20 shows a further canned motor pump S″ wherein a clutch having magnets 206 is employed to transmit torque between a motor-driven driving unit 202, 3 and a driven unit 4. The can 209 of this pump is constructed in such a way that the inner tube 14 can be removed independently of the outer tube 21 and vice versa without the need for destruction of welded seams during removal or for the making of welded seams during insertion of such tubes. The can 209 has a composite end wall 13 (see also FIG. 21) including an inner panel 232 which is welded to the respective end of the inner tube 14 by a seam 22 and an outer panel 231 which is welded to a ring 231A; the latter is welded, in turn, to the right-hand end of the outer tube 21. The pump shaft 26 of the driven unit 4 shown in FIG. 20 is rotatable in friction bearings 24, 25 and has an axial bore 27 for a stream of conveyed fluid medium which is branched off the main stream 8 and returns into the main stream by flowing in the direction of arrows Pf2. The left-hand end portion of the shaft 26 drives one or more pumping elements 105 in the chamber of the pump housing P.

The left-hand end of the inner tube 14 is secured to a radially outwardly extending collar or flange 30 which is installed in a complementary recess 31 of a support or flange 219 and is separably secured thereto by screws 32 or analogous fastener means. The right-hand end of the inner tube 14 is secured only to the panel 232 of the end wall 13 but not to the outer panel 231 and/or to any other part. The left-hand end of the outer tube 21 is secured to a radially outwardly extending collar 30′ which is recessed into the right-hand end face of the support 219 and is releasably secured thereto by the aforementioned fasteners 32. The left-hand ends of the tubes 14, 21 are preferably mechanically secured to the respective collars 30, 30′ by welded seams. The seam between the tube 14 and the collar 30 is shown at 22.

The support or flange 219 is formed with or includes a separate nozzle (not shown) for admission of heat exchange fluid 211 into the annular space 210 between the tubes 14, 21 as well as into the space between the panels 231, 232 of the composite end wall 13 of the can 209. Spent heat exchange fluid leaves the annular space 210 by way of the evacuating nozzle 218 in the support 219 diametrically opposite the fluid admitting nozzle.

The heat exchange fluid 211 is admitted first into a ring-shaped channel (only the section 222a of this channel can be seen in FIG. 20) which is analogous to the channel 222 of FIG. 2 and can contain guide means corresponding to the guide means 225, 226 shown in FIGS. 2–4.

The pump S″ of FIG. 20 further comprises a tubular seat 23 which is an integral part of the pump housing P and supports the bearings 24, 25 for the shaft 26.

FIG. 22 shows a modification of the pump S″ of FIGS. 20–21. The can 209 has an outer tube 21, an inner tube 14 and a composite end wall including parallel plate-like panels 231, 232. The front end of the inner tube 14 is welded to a radially outwardly extending collar 30 at 22. The collar 30 is confined in a recess 31 of the support or flange 219 and is secured thereto by screws 32 or analogous fasteners. The front end of the outer tube 21 is welded directly to the support 219, as at 22′. The support 219 is provided with the fluid admitting means (not shown) and with fluid evacuating means 218 diametrically opposite the fluid admitting means. The support 219 is further connected with an extension 201 which forms part of the pump housing and surrounds the driving unit of the pump. Such driving unit transmits torque to the driven unit (not shown) within the confines of the can 209. The evacuating means 218 can be installed in the lower part (not shown) of the support 219, and the fluid admitting means (such as the nozzle 217 of FIG. 2) then occupies the position of the evacuating means 218 shown in FIG. 22.

If the can 209 is to be dismantled, the outer tube 21 is removed in a first step together with the panel 231 and support 219, and the inner tube 14 is removed in the next step, together with the collar 30 and panel 232. If desired, the tubes 14, 21 can be removed jointly with the parts 231, 232, 30 and 219, and the fasteners 32 are removed thereafter so as to allow for separation of the tube 21 from the tube 14. Such separation of the tubes 14, 21 does not necessitate the destruction of any of the welded seams. Analogously, no fresh welded seams must be made for the purpose of installing a new inner tube 14 and/or a new outer tube 21.

FIG. 22 further shows a bearing 212 which is provided at the inner side of the panel 232 and cooperates with the adjacent end portion of the driven unit.

The likelihood of uncontrolled mixing of heat exchange fluid with the conveyed fluid medium and/or of uncontrolled escape of conveyed fluid medium into the area around the improved canned motor pump is further reduced if the inner tube and/or the outer tube of the can is assembled of two or more tubular sections so that the total number of tubular walls of the can is increased accordingly.

Figure 15:
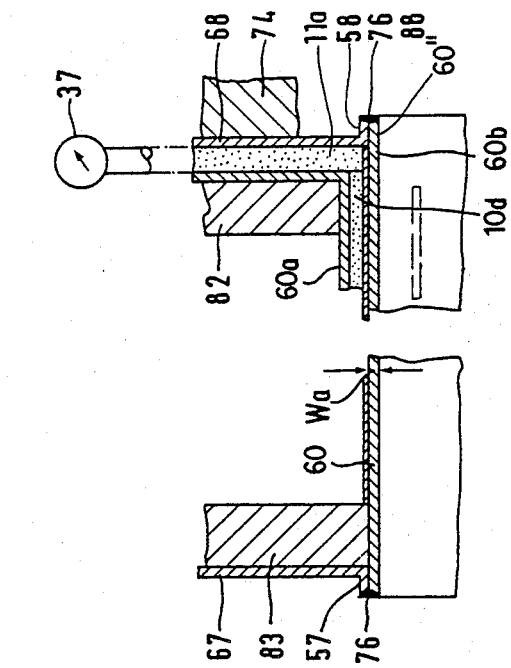
FIG. 15 is a fragmentary axial sectional view of an additional can wherein the outer tube comprises a plurality of concentric tubular sections.

The lower portion of FIG. 14 shows, by way of example, that the inner tube 61″ of a can can have two concentric tubular sections 61a and 61b, and the lower portion of FIG. 15 shows that the outer tube 60″ of the can can have two concentric tubular sections 60a, 60b. The annular space 10d between the tubular sections 61a, 61b or 60a, 60b can be filled with a flowable indicating substance 11a whose pressure is monitored at 7 to indicate the presence of leaks when the pressure rises above or drops below a preselected value which indicates that a fluid whose pressure is higher than the normal pressure of the substance 11a has penetrated between the sections 61a, 61b or 60a, 60b or that the substance 11a has been permitted to escape into an area wherein the pressure is lower than the standard pressure in the space between the sections 61a, 61b or 60a, 60b. Another indicating means which can serve to inform the attendants of leaks in the section 61a and/or 61b is shown in FIG. 14 at 12. Such indicating means can change its color and/or other characteristics when contacted by the heat exchange fluid and/or by the conveyed fluid medium. Alternatively, the indicating indicting means 12 can constitute a foil which overlies a leak in the section 61a and/or 61b to thus prevent escape of the substance 11a and/or penetration of heat exchange fluid and/or conveyed fluid medium into the space between 61a and 61b.

The mutual spacing of tubular sections 61a, 61b and/or 60a, 60b can be so small that these sections define an annular clearance for the flow of gaseous media but not for the flow of a liquid substance. In other words, the section 61a can actually abut the section 61b and/or the section 60a can practically abut the section 60b.

It is further clear that the can embodying the structure of FIG. 14 or 15 can be equipped with other types of leak indicating means, e.g., with the leak indicating or detecting means 95-98 of FIG. 16. All such precautionary measures are undertaken to avoid damage to the pump, contamination of the surrounding area and/or injury to the attendants. The number and complexity of precautionary measures will depend on the nature of fluids in the improved pump. At any rate, the leak detectors and leak preventing means should suffice to make sure that the versatility of the improved pump is not affected, i.e., that the pump can convey highly aggressive fluid media as well as practically all other types of fluid media because the number of safety features is simply increased if warranted by the nature of the fluid medium and/or of the heat exchange fluid. For example, the heat exchange medium can be maintained at an elevated temperature in order to prevent an undue increase of viscosity or actual solidification of the conveyed fluid medium while the pump is idle and a quantity of fluid medium is confined in the interior of the can. The heat exchange fluid can but need not be identical with the conveyed fluid medium. Even highly aggressive heat exchange fluids can be used if they are satisfactory or best suited for heating or cooling of the conveyed fluid medium. All that is necessary is to adequately reinforce the can and to provide reliable means for indicating the presence of leaks as well as reliable means for preventing contamination or other damage to parts (such as the stator of an electric motor) in the pump housing in the event of leakage of one or more walls of the can.

The features which are shown in FIGS. 14 and 15 can be incorporated (either jointly or singly) in each of the improved canned motor pumps.

All embodiments of the improved canned motor pump wherein the can defines one or more internal spaces for a heat exchange medium exhibit the important advantage that they are much less likely to contaminate the surrounding atmosphere and/or to cause injury and/or damage due to aggressiveness of the conveyed fluid medium and/or due to certain characteristics of the heat exchange medium than heretofore known canned motor pumps. This holds true irrespective of whether the driven unit of the pump receives torque by way of a clutch or from the stator elements of an electric motor.

Another important advantage of the improved pump, especially of that which is shown in FIGS. 16 to 22, is that it is possible to replace certain portions of the can without the need to discard the remaining portion or portions. This contributes to lower maintenance and repair cost of the pump. Moreover, replacement of certain parts of the can can be carried out by semiskilled personnel because there is no need to employ apparatus for destruction of welded connections and/or apparatus for making welded connections with a degree of precision which is as high as that required in many canned motor pumps.

Still another important advantage of the improved pump is that it can employ a wide variety of heat exchange fluids because such fluids can be readily and reliably confined to flow along their contemplated paths so that the selection of an appropriate heat exchange fluid is dependent solely upon its characteristics as concerns the heating or cooling action upon the can and/or in the region immediately adjacent the can. In order to reliably confine the heat exchange fluid, the designer of the pump will merely select appropriate materials for the walls of the improved can and/or an appropriate number of walls and spaces between the walls. Moreover, the pump can be furnished with a more or less sophisticated leakage indicating system to ensure timely warning to the attendants and/or stoppage of the pump in the event of leakage of conveyed fluid medium and/or heat exchange fluid.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A canned motor pump, comprising a hollow driving unit; a rotary driven unit at least partly surrounded by said driving unit; means for sealing said units from each other, including a can interposed between said units and including a plurality of walls defining at least one space; means for admitting a heat exchange fluid into said space; and flange means mounted on said walls in sealing relationship therewith, said admitting means being provided in said flange means.

2. The pump of claim 1, wherein the width of said space in the radial direction of said driven unit is 0.1-3 mm.

3. The pump of claim 2, wherein the width of said space is 0.1-0.5 mm.

4. The pump of claim 1, wherein said driven unit comprises a pumping element and said can has a first end adjacent to and a second end remote from said pumping element, said walls including an inner tube and an outer tube and said tubes being at least substantially coaxial with said driven unit, at least part of said flange means being disposed in the region of one end of said can.

5. The pump of claim 4, wherein said flange means includes a flange at the first end of can.

6. The pump of claim 5, further comprising means for mechanically connecting said flange to at least one tube.

7. The pump of claim 4, wherein said flange means includes a flange at the second end of said can.

8. The pump of claim 4, comprising a closure at the second end of said can.

9. The pump of claim 4, further comprising fluid evacuating means provided in said flange means and arranged to establish a path for evacuation from said space of fluid which is supplied by said admitting means.

10. The pump of claim 4, wherein said flange means comprises a first flange sealingly connected to at least one of said tubes at the first end and a second flange sealingly connected to at least one of said tubes at the second end of said can, said admitting means being provided in one of said flanges and further comprising fluid evacuating means provided in the other of said flanges and arranged to establish a path for evacuation from said space of fluid which is supplied by said admitting means.

11. The pump of claim 4, wherein said flange means comprises a flange sealingly connected with at least one of said tubes at one end of said can, said admitting means being provided in said flange and further comprising fluid evacuating means provided in said flange and arranged to establish a path for evacuation from said space of fluid which is supplied by said admitting means.

12. The pump of claim 1, further comprising means for evacuating from said space heat exchange fluid which is supplied by said admitting means so that the fluid flows from said admitting means to said evacuating means; and further comprising guide means for regulating the flow of fluid in said space.

13. The pump of claim 12, wherein said driven unit includes a pumping element and said can has a first end nearer to and a second end more distant from said pumping element, said guide means being adjacent one end of said can.

14. The pump of claim 13, wherein said cans further comprises an end wall at the second end thereof, said guide means being adjacent said end wall.

15. The pump of claim 12, wherein said guide means is at least substantially parallel to the axis of said rotary driven unit.

16. The pump of claim 1, wherein said driven unit comprises a pumping element and said can has a first end nearer to and a second end more distant from said pumping element, said cans further comprising an end wall at said second end thereof and said end wall having at least one passage forming part of said space.

17. The pump of claim 16, wherein said end wall includes a plurality of panels flanking said passage.

18. The pump of claim 1 for conveying fluid media within a predetermined pressure range including an elevated pressure prevailing in the interior of said can, said walls including a relatively thin inner tube and a thicker outer tube spacedly surrounding said inner tube.

19. The pump of claim 18, wherein the thickness of said inner tube is a small fraction of the thickness of said outer tube.

20. The pump of claim 1, wherein said rotary driven unit includes a pumping element and said can has a first end nearer to and a second end more distant from said pumping element, said walls including an inner tube and an outer tube spacedly surrounding said inner tube; and further comprising a collar rigid with and extending substantially radially outwardly from one of said tubes at one end of said can, a housing for said can, and means for separably mounting said collar in said housing so that the collar and said one tube can be jointly installed in and jointly removed from said housing.

21. The pump of claim 20, wherein said cans further comprises an end wall sealingly secured to said one tube at the other end of said can.

22. The pump of claim 20, wherein said flange means includes a flange at the other end of said can, said flange having a hole and said one tube having an end portion in said hole, said sealing means further comprising at least one annular sealing element interposed between the end portion of said one tube and said flange.

23. The pump of claim 22, wherein said flange has means for evacuating fluid from said space.

24. The pump of claim 22, wherein said annular sealing element comprises at least one elastic ring.

25. The pump of claim 22, wherein said housing includes means for centering said flange and said one tube with reference to the axis of rotation of said driven unit.

26. The pump of claim 22, wherein said housing further comprises a closure for the end portion of said one tube, said flange and said closure being disposed at the second end of said can and said closure having a centering portion extending into the end portion of said one tube.

27. The pump of claim 1, further comprising evacuating means defining a path for evacuation from said space of fluid which is supplied by said admitting means, and leak detector means including means for monitoring the rates of admission of fluid into and evacuation of fluid from said space.

28. The pump of claim 1, wherein said walls include an inner tube and an outer tube spacedly surrounding said inner tube, said tubes being substantially coaxial with said rotary driven unit and said space having an annular portion between said tubes, at least one of said tubes having two tubular sections defining an annular compartment; and further comprising leak detector means operatively connected with said one tube and having means for indicating the presence of leaks in said tubular sections.

29. The pump of claim 1, wherein said walls are fixed relative to one another.

30. The pump of claim 1, wherein said walls include a tubular outer wall and a tubular inner wall which is substantially coaxial with said outer wall.

31. A canned motor pump, comprising a hollow driving unit; a rotary driven unit at least partly surrounded by said driving unit, said driven unit including a pumping element; means for sealing said units from each other, including a can interposed between said units and having a first end nearer to and a second end more distant from said pumping element, said can having a plurality of walls defining at least one space, and said walls comprising an inner tube, an outer tube spacedly surrounding said inner tube and an end wall at said second end of said can, said end wall having at least one passage which forms part of said space and including a plurality of panels flanking said passage, said panels comprising first and second panels respectively sealing said inner and outer tubes at said second end of said can, and said tubes being substantially coaxial with said rotary driven unit; and means for admitting a heat exchange fluid into space.

32. A canned motor pump for conveying fluid media within a predetermined pressure range including an elevated pressure, comprising a hollow driving unit; a rotary driven unit at least partly surrounded by said driving unit; means for sealing said units from each other, including a can interposed between said units and including a plurality of walls defining at least one space, said elevated pressure prevailing in the interior of said can, and said walls comprising a relatively thin inner tube and a thicker outer tube spacedly surrounding said inner tube, said space including an annular portion between said tubes, and said inner tube being elastically deformable to expand radially outwardly toward and into engagement with said outer tube in response to a drop of pressure in said annular portion to a predetermined level below said elevated pressure; and means for admitting a heat exchange fluid into said space.

33. A canned motor pump, comprising a hollow driving unit; a rotary driven unit at least partly surrounded by said driving unit, said rotary driven unit including a pumping element; means for sealing said units from each other, including a can interposed between said units and having a first end nearer to and a second end more distant from said pumping element, said can comprising a plurality of walls defining at least one space, and said walls including an inner tube and an outer tube spacedly surrounding said inner tube; a first collar rigid with and extending substantially radially outwardly from one of said tubes at one end of said can; a second collar for the other of aid tubes disposed at said one end of said can; a housing for said can including a flange at the other end of said can, said flange being provided with a hole and each of said tubes having an end portion in said hole, said sealing means further comprising a first annular sealing element interposed between the end portion of said one tube and said flange, and a second annular sealing element interposed between the end portion of said other tube and said flange; means for separably mounting said first collar in said housing so that said first collar and said one can be jointly installed in and jointly removed from said housing; and means for admitting a heat exchange fluid into said space.

* * * * *